United States Patent
Kusunoki et al.

(10) Patent No.: US 6,927,680 B2
(45) Date of Patent: Aug. 9, 2005

(54) APPARATUS FOR ASSISTING REGISTRATION OF VEHICLE WHEEL IDENTIFICATION DATA, AND APPARATUS FOR ASSISTING REGISTRATION OF DATA-PROCESSING INFORMATION

(75) Inventors: Hideki Kusunoki, Nishikamo-gun (JP); Shinichi Tomioka, Toyota (JP); Kazuhisa Meguro, Toyota (JP); Nobuhiro Ide, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 27 days.

(21) Appl. No.: 10/644,781

(22) Filed: Aug. 21, 2003

(65) Prior Publication Data

US 2004/0056764 A1 Mar. 25, 2004

(30) Foreign Application Priority Data

Sep. 13, 2002 (JP) .......................... 2002-268198

(51) Int. Cl.[7] .............................................. B60C 23/00
(52) U.S. Cl. ........................... 340/442; 701/29; 701/32; 701/33; 340/445; 74/146; 74/146.4; 74/146.5
(58) Field of Search ................................ 74/146, 146.4, 74/146.5; 701/1, 29, 32, 33; 340/442, 445

(56) References Cited

U.S. PATENT DOCUMENTS

| | | | |
|---|---|---|---|
| 4,734,674 A | | 3/1988 | Thomas et al. |
| 5,473,938 A | * | 12/1995 | Handfield et al. .......... 73/146.5 |
| 5,602,524 A | * | 2/1997 | Mock et al. ................ 340/447 |
| 6,243,007 B1 | * | 6/2001 | McLaughlin et al. ....... 340/447 |
| 6,275,148 B1 | * | 8/2001 | Takamura et al. .......... 340/442 |
| 6,340,930 B1 | | 1/2002 | Lin |
| 6,414,592 B1 | * | 7/2002 | Dixit et al. ................ 340/447 |
| 6,430,484 B1 | * | 8/2002 | Takamura et al. ............. 701/29 |
| 6,441,727 B1 | * | 8/2002 | LeMense .................... 340/442 |
| 6,441,728 B1 | * | 8/2002 | Dixit et al. ................ 340/447 |
| 2001/0050611 A1 | | 12/2001 | Achterholt |
| 2002/0126005 A1 | * | 9/2002 | Hardman et al. ........... 340/442 |
| 2003/0000296 A1 | | 1/2003 | Schmitt |
| 2003/0179082 A1 | * | 9/2003 | Ide .......................... 340/425.5 |

FOREIGN PATENT DOCUMENTS

| | | |
|---|---|---|
| DE | 199 26 616 C2 | 12/2000 |
| DE | 199 51 273 A1 | 6/2001 |
| DE | 100 14 076 A1 | 10/2001 |
| JP | A 7-507513 | 8/1995 |
| JP | A 2000-103209 | 4/2000 |
| JP | A 2000-233615 | 8/2000 |
| JP | A 2002-131165 | 5/2002 |

\* cited by examiner

*Primary Examiner*—Michael J. Zanelli
*Assistant Examiner*—Eric M. Gibson
(74) *Attorney, Agent, or Firm*—Oliff & Berridge, PLC

(57) ABSTRACT

An apparatus operable with a system which includes a body-side device and wheel-side devices and in which vehicle-state data such as wheel-state data representative of wheel states are transmitted by radio communication from the wheel-side devices to the body-side device, together with wheel identification data identifying the wheels. The apparatus includes antennas attached to each wheel inspecting device which is arranged to rotate the corresponding so that the antennas are sequentially aligned with the wheel-side device, and transmit trigger signals in response to which the wheel identification data are transmitted from the wheel-side device to the body-side device and registered in the body-side device. The apparatus assists the system so as to automate the registration of the wheel identification data, thereby eliminating a manual operation to bring a trigger device to the positions of the wheels to command the wheel-side devices to transmit the wheel identification data.

35 Claims, 12 Drawing Sheets

APPARATUS FOR ASSISTING REGISTRATION OF VEHICLE WHEEL IDENTIFICATION DATA, AND APPARATUS FOR ASSISTING REGISTRATION OF DATA-PROCESSING INFORMATION

This application is based on Japanese Patent Application No. 2002-268198 filed Sep. 13, 2002, the contents of which are incorporated hereinto by reference.

BACKGROUND OF THE INVENTION

1. Field of the Invention

The present invention relates in general to a vehicle-state obtaining apparatus arranged to obtain a state of a vehicle by communication between a remote detecting device and an information processing device, and more particularly to an apparatus arranged to assist registration of information corresponding to data-processing information, in at least one of the information processing device and the remote detecting device.

2. Discussion of Related Art

JP-A-7-507513, JP-A-2000-103209, JP-A-2000-233615 and JP-A-2002-131165 disclose a vehicle-state obtaining apparatus which includes a remote detecting device in the form of wheel-side devices provided on a vehicle and an information processing device in the form of a body-side device provided on the vehicle, and which is arranged to obtain a state of the vehicle by communication between the remote detecting device and the information processing device. The vehicle-state obtaining apparatus disclosed in JP-A-2002-131165 is arranged such that information corresponding to data-processing information in the form of wheel identification data is registered in the body-side device. In this apparatus, the worker brings a trigger device operable to generate a trigger signal, sequentially to positions at which the trigger device is located close and opposed to the respective wheel-side devices provided for respective wheels of the vehicle. At each of those positions, the trigger device is activated so that the wheel identification data are transmitted from the corresponding wheel-side device to the body-side device, and the information corresponding to the wheel identification data transmitted from each wheel-side device is registered in the body-side device.

SUMMARY OF THE INVENTION

It is an object of the present invention to automate an operation associated with the registration of information corresponding to data-processing information, in at least one of an information processing device and a remote detecting device.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A wheel-identification-data registration assisting apparatus operable with a system including a body-side device disposed on a body of a vehicle and a plurality of wheel-side devices disposed on respective wheels of the vehicle, the apparatus being operable to assist the system in an operation associated with registration in the body-side device of information corresponding to wheel identification data which identify each of the plurality of wheel-side devices and which are transmitted from each wheel-side device, the wheel-identification-data registration assisting apparatus comprising:

a plurality of wheel-identification-data registration assisting devices, operable when located close to the wheels, respectively, to assist the above-indicated system in at least a portion of the operation associated with the registration of the information corresponding to the wheel identification data in the body-side device; and an assisting-device control device operable to control the plurality of wheel-identification-data registration assisting devices.

(2) The apparatus according to the above mode (1), wherein each of the plurality of wheel-identification-data registration assisting devices includes at least one of (a) a registration assisting portion operable to assist the above-indicated system in at least a portion of a series of operation of the system from transmission of the wheel identification data from a corresponding one of the plurality of wheel-side devices to the registration of the information corresponding to the wheel identification data in the body-side device, and (b) a data-inspection assisting portion operable to assist the system in at least a portion of a series of operation from the transmission of the wheel identification data from the above-indicated corresponding one wheel-side device to inspection of the information corresponding to the wheel identification data which has been registered in the body-side device.

The wheel-identification-data registration assisting apparatus according to the above mode (1) of this invention is operable to assist the above-indicated system in the operation associated with the registration of the information corresponding to the wheel identification data in the body-side device. The operation associated with the registration includes an operation to register the information corresponding to the wheel identification data, and an operation to inspect the information registered in the body-side device. The present apparatus is arranged to assist the system in at least one of these operations, more precisely, in at least a portion of at least one of these operations between the moments of initiation and termination of the operation. Thus, the operation associated with the registration of the information corresponding to the wheel identification data is at least partly automated by the assistance of the present assisting apparatus, so that the worker is freed from a manual operation to bring a trigger device to the positions close to the respective wheels of the vehicle.

Each of the wheel-identification-data registration assisting devices disposed close to the respective wheels may include at least one of the registration assisting portion and the data-inspection assisting portion, as in the apparatus according to the above mode (2). The registration assisting portion is operable to assist the system in at least a portion of a series of operation of the system from the transmission of the wheel identification data from the wheel-side device (from the moment of initiation of the operation) to the registration of the information corresponding to the wheel identification data in the body-side device (to the moment of termination of the operation). For instance, the registration assisting portion is arranged to assist the system in the operation to transmit the wheel identification data from the wheel-side device to the body-side device, the operation to supply the body-side device with the wheel identification data, or the operation to register in the body-side device the information corresponding to the wheel identification data.

On the other hand, the data-inspection assisting portion is operable to assist the system in at least a portion of a series of operation from the transmission of the wheel identification data from the wheel-side device (from the moment of initiation of the operation) to the inspection of the registered information corresponding to the wheel identification data (to the moment of termination of the operation). The data-inspection assisting portion is arranged to check whether the information corresponding to the wheel identification data registered in the body-side device correctly identifies the wheel corresponding to the wheel-side device in question. For example, the data-inspection assisting portion is arranged to assist the system in the operation to transmit the wheel identification data from the wheel-side device, the operation to supply the body-side device with the wheel identification data, or the operation to check the information registered in the body-side device.

The wheel-identification-data registration assisting device is controlled by the assisting-device control device, which may be principally constituted by a computer. The assisting-device control device controls the assisting device, so as to control the specific manner and timing of assistance by the assisting device.

The information corresponding to the wheel identification data, which is to be registered in the body-side device, may be identical with the wheel identification data as received from the wheel-side device, or different from the wheel identification data. Where the wheel identification data received from the wheel-side device represent a numerical value indicative of the wheel corresponding to the wheel-side device, for instance, the information to be registered in the body-side device may be such that a sum or a difference of the numerical value represented by the information registered in the body-side device and the numerical value represented by the received wheel identification data is equal to a predetermined value. Namely, the information to be registered in the body-side device is considered to "correspond to the wheel identification data", provided the wheel corresponding to the wheel-side device or the position of that wheel on the vehicle (front right, front left, rear right or rear left position) is identified or represented by the information registered in the body-side device and the wheel identification data received from the wheel-side device.

The plurality of wheel-identification-data registration assisting devices are disposed close to the respective wheels of the vehicle, and are operable when the assisting devices are located at positions substantially aligned with predetermined positions relative to the respective wheels. While the assisting devices need not be located exactly at the predetermined positions relative to the respective wheels, the assistance by each assisting device can be held constant if the assisting device is operated when it is located exactly at the predetermined relative position.

For example, the information corresponding to the wheel identification data is registered in the body-side device while the vehicle is mounted on a suitable supporting device. In this case, the wheel-identification-data registration assisting devices of the assisting apparatus are disposed on the supporting device, and the vehicle is mounted on the supporting device, at a predetermined position relative to the supporting device, such that the assisting devices are disposed close to the respective wheels of the vehicle thus mounted on the supporting device. Alternatively, the information corresponding to the wheel identification data is registered in the body-side device while the vehicle is located at a predetermined position on a floor or ground. In this case, the assisting devices are positioned close to the respective wheels of the vehicle thus located on the floor or ground. Further alternatively, the assisting devices are attached to respective support members, and the vehicle is positioned relative to the assisting devices such that the assisting devices are disposed close to the respective wheels. The support members are arranged to maintain predetermined relative positions between the assisting devices and the wheels, irrespective of a small amount of movement of the vehicle. It is also possible to mount the assisting devices on the body of the vehicle such that the assisting devices are disposed close to the respective wheels or movable to the positions close to the wheels.

The wheel-identification-data registration assisting apparatus according to the above mode (1) may be arranged to be operable with a wheel-state obtaining system wherein each of the plurality of wheel-side devices includes a wheel-state detecting portion operable to detect a state of the corresponding wheel, and the body-side device obtains wheel-state data representative of the state of the wheel detected by the wheel-state detecting portion, by communication with each wheel-side device in a wireless fashion (e.g., by radio waves). In this case, the assisting apparatus is arranged to assist the wheel-state obtaining system in an operation to inspect the information corresponding to the wheel identification data, which has been registered in the body-side device. In the wheel-state obtaining system assisted by the present assisting apparatus, the body-side device receives from each of the wheel-side devices both the wheel identification data identifying the corresponding wheel and the wheel-state data representative of the detected state of the wheel. On the basis of the registered information and the wheel identification data received from the wheel-side device, the body-side device recognizes the wheel the wheel-state data of which have been received, and obtains the wheel-state data of the wheel thus recognized.

(3) The wheel-identification-data registration assisting apparatus according to the above mode (1) or (2), wherein the plurality of wheel-identification-data registration assisting devices include respective transmission-commanding portion operable to command the plurality of wheel-side devices, respectively, to transmit the wheel identification data, and the assisting-device control device includes a transmission control portion operable to control the transmission-commanding portions to control the transmission of the wheel identification data from each of the plurality of wheel-side devices.

In the wheel-identification-data registration assisting apparatus according to the above mode (3), each wheel-side device is commanded by the transmission-commanding portion to transmit the wheel identification data, so that the transmitted wheel identification data are received by the body-side device. In the body-side device, the information corresponding to the received wheel identification data is registered (stored in a memory). If necessary, the information registered in the body-side device is inspected on the basis of the received wheel identification data.

The transmission-commanding portions of the wheel-identification-data registration assisting devices are controlled by the transmission control portion of the assisting-device control device. For example, the transmission control portion controls the transmission-commanding portions so as to control the timing and order of transmission of the wheel identification data from the wheel-side devices. For instance, the wheel-side devices (corresponding to the front right and left, and rear right and left wheels) are commanded in a predetermined order by the transmission-commanding portions under the control of the transmission control portion, to transmit the wheel identification data. Alternatively, each wheel-side device is commanded by the corresponding transmission-commanding portion under the control of the transmission control portion, to transmit the wheel identification data within a predetermined period of time.

(4) The wheel-identification-data registration assisting apparatus according to the above mode (1) or (2), wherein each of the wheel-identification-data registration assisting devices includes an indicator portion operable upon reception of the wheel identification data from a corresponding one of the plurality wheel-side devices, to supply the body-side device with at least one of the wheel identification data and information indicating the reception of the wheel identification data, and the assisting-device control device includes a control portion operable to control the indicator portion of each wheel-identification-data registration assisting device.

In the wheel-identification-data registration assisting apparatus according to the above mode (4), each wheel-identification-data registration assisting device receives the wheel identification data transmitted from the corresponding wheel-side device. Upon reception of the wheel identification data, the indicator portion supplies the body-side device with (i) the received wheel identification data, (ii) the information indicating the reception of the wheel identification data, or (iii) both of the received wheel identification data and the information indicating the reception of the wheel identification data. The information indicating the reception may include data indicative of the position of the wheel corresponding to the wheel-side device from which the wheel identification data have been received. Since the wheel-identification-data registration assisting devices are provided for the respective wheels, the position of the wheel (front right, front left, rear right or rear left wheel) corresponding to the wheel-side device from which the wheel identification have been received is known to each assisting device.

In the cases (i) and (iii) described above, the body-side device registers the information corresponding to the wheel identification data received from the indicator portion of the wheel-identification-data registration assisting device. The reliability of registration of the information in the body-side device is improved in the case (iii) in which not only the wheel identification data but also the information indicating the reception of the wheel identification data by the assisting device are supplied to the body-side device. Where the information indicting the reception includes the data indicative of the position of the wheel in question, the wheel identification data of each wheel can be registered in the body-side device, in relation to the data indicative of the position of the wheel. This arrangement is desirable. In the case (ii), the provision of the indicator portion is effective where the wheel identification data are transmitted from the wheel-side devices to the body-side device, at a predetermined time interval. In this instance, the wheel identification data are registered in the body-side device when the information indicating the reception of the wheel identification data by the assisting device is received from the indicator portion after the body-side device has received the wheel identification data from the corresponding wheel-side device.

The information registered in the body-side device as a result of reception of the wheel identification data by the body-side device may be inspected.

The indicator portion of each wheel-identification-data registration assisting device may be arranged to supply the body-side device with the wheel identification data and/or the information indicating the reception of the wheel identification data by the indicator portion, either through a signal line or by transmission or communication in a wireless fashion. The wheel identification data and/or the information indicating the reception may be supplied from the indicator portion directly to the body-side device, or indirectly to the body-side device through the assisting-device control device.

The indicator portions of the assisting devices are controlled by the control portion of the assisting device, so that the timing and order of supply of the wheel identification data and/or the information indicating the reception from the assisting devices to the body-side device are controlled.

Where each wheel-identification-data registration assisting device includes memory means for storing the wheel identification data received from the corresponding wheel-side device, the wheel identification data and/or the information indicating the reception can be supplied to the body-side device at a desired time after the moment at which the wheel identification data are received from the wheel-side device. For example, the wheel identification data and/or the information indicating the reception can be supplied to the body-side device after all of the assisting devices have received the wheel identification data from the respective wheel-side devices.

(5) The wheel-identification-data registration assisting apparatus according to the above mode (1) or (2), wherein each of the wheel-identification-data registration assisting devices includes a wheel-identification-data supply portion operable upon reception of the wheel identification data from a corresponding one of the plurality wheel-side devices, to supply the body-side device with the wheel identification data received from the above-indicated corresponding one wheel-side device, and the assisting-device control device includes a control portion operable to control the wheel-identification-data supply portion of each wheel-identification-data registration assisting device.

(6) The wheel-identification-data registration assisting apparatus according to the above mode (1) or (2), wherein each of the wheel-identification-data registration assisting devices includes a registration assisting portion operable to assist the body-side device to register the information corresponding to the wheel identification data, and the assisting-device control device includes a registration control portion operable to control the registration assisting portion of each wheel-identification-data registration assisting device.

In the wheel-identification-data registration assisting apparatus according to the above mode (6), each wheel-identification-data registration assisting device assists the body-side device to register the information corresponding to the wheel identification data received from the corresponding wheel-side device.

For example, the registration assisting portion of the wheel-identification-data registration assisting device is arranged to supply the body-side device with a mode-changing signal in response to which an operation mode of the body-side device is changed from a wheel-state obtaining mode to obtain a state of the vehicle, to a wheel-identification-data registering mode to register the information corresponding to the wheel identification data. In this case, the body-side device is held in the wheel-identification-data registering mode for a predetermined length of time during which the wheel identification data are transmitted from the wheel-side device to the body-side device, so that the information corresponding to the wheel identification data received by the body-side device is registered in the body-side device. Alternatively, the registration assisting portion of the assisting device is arranged to supply the body-side device with registration-requesting information requesting the body-side device to register the information corresponding to the wheel identification data. The body-side device may be arranged to register the information corresponding to the wheel identification data received after the reception of the registration-requesting information. Alternatively, the body-side device is arranged to store the wheel identification data for a predetermined period of time, and register the information corresponding to the wheel identification data which are received within this predetermined period of time.

The registration control portion of the assisting-device control device controls the registration assisting portions of the wheel-identification-data registration assisting devices, to control the timing and order of transmission of the mode-changing signal or the registration-requesting information from the respective assisting devices, so as to control the timing and order of registration of the information corresponding to the wheel identification data received from the respective wheel-side devices.

It is noted that each of the plurality of wheel-identification-data registration assisting devices may include at least two of the transmission-commanding portion, indicator portion, wheel-identification-data supply portion and registration assisting portion, which have been described above.

(7) The wheel-identification-data registration assisting apparatus according to any one of the above modes (1)–(6), wherein each of the plurality of wheel-identification-data registration assisting devices includes an inspection assisting portion operable to assist the body-side device to inspect the information corresponding to the wheel identification data, which information have been registered in the body-side device, and the assisting-device control device includes an inspection control portion operable to control the inspection assisting portion of each wheel-identification-data registration assisting device.

In the wheel-identification-data registration assisting apparatus according to the above mode (7), the inspection assisting portion of each wheel-identification-data registration assisting device is arranged to assist the body-side device to inspect the information registered in the body-side device. For example, the inspection assisting portion is arranged to command the corresponding wheel-side device to transmit the wheel identification data to the body-side device, so that the body-side device compares the information already stored in memory means thereof, with the wheel identification data received from the wheel-side device, to check if the stored information corresponds to the received wheel identification data.

The inspection of the information registered in the body-side device may be effected immediately after the registration, or after a state of the corresponding wheel is obtained on the basis of the registered information. In the latter case, the inspection of the registered information may be effected in a process of inspection of the vehicle after the registration of the information, and before the delivery of the vehicle from the manufacturer. Alternatively, the inspection may be effected after the delivery of the vehicle from the manufacturer, for example, when the vehicle owned by the user is subjected to a periodic inspection, or when any trouble with the vehicle is found.

(8) The wheel-identification-data registration assisting apparatus according to the above mode (7), wherein the inspection assisting portion includes a data-transmission commanding portion operable to command a corresponding one of the plurality of wheel-side devices to transmit the wheel identification data to the body-side device.

In the wheel-identification-data registration assisting apparatus according to the above mode (8), the wheel-side device transmits the wheel identification data to the body-side device in response to a command from the data-transmission commanding portion of the assisting device. On the basis of the wheel identification data thus transmitted from the wheel-side device, the body-side device checks if the information registered in the body-side device correctly identifies the wheel.

(9) The wheel-identification-data registration assisting apparatus according to the above mode (1) or (2), wherein each of the plurality of wheel-identification-data registration assisting devices includes a signal transmitting portion operable to effect at least one-way transmission of a signal between a corresponding one of the plurality of wheel-side devices and the signal transmitting portion, each wheel-identification-data registration assisting device being operable when the signal transmitting portion is located close to the above-indicated corresponding one wheel-side device, to assist the above-indicated system in at least a portion of a series of operation of the system from transmission of the wheel identification data from the above-indicated corresponding one wheel-side device to the registration of the information corresponding to the wheel identification data in the body-side device.

The signal transmitting portion is arranged to effect at least one-way transmission of a signal to and/or from the corresponding wheel-side device. That is, the signal transmitting portion has a signal receiving portion capable of receiving the signal from the corresponding wheel-side device, and/or a signal transmitting portion capable of transmitting the signal to the wheel-side device. For example, the signal transmitting portion is arranged to receive the signal in the form of the wheel identification data transmitted from the corresponding wheel-side device and transmit the received wheel identification data to the body-side device so that the information corresponding to the received wheel identification data is registered in the body-side device. Alternatively, the signal transmitting portion is arranged to transmit the signal to the corresponding wheel-side device to command this device to transmit the wheel identification data to the body-side device so that the information corresponding to the received wheel identification data is registered in the body-side device. Thus, the wheel-identification-data registration assisting device the signal transmitting portion is operable to assist the above-indicated system in at least a portion of the series of operation from the transmission of the wheel identification data from the wheel-side device to the registration of the information in the body-side device.

The body-side device may be arranged to inspect the information already registered therein, on the basis of the wheel identification data received from the signal transmitting portion or on the basis of the wheel identification data received from the wheel-side device in response to the signal transmitted from the signal transmitting portion. The body-side device checks if the information registered therein corresponds to the wheel identification data received from the signal transmitting portion or the wheel-side device.

The signal transmitting portion of each wheel-identification-data registration assisting device includes only one signal transmitter or a plurality of signal transmitters.

(10) The wheel-identification-data registration assisting apparatus according to the above mode (9), wherein the signal transmitting portion is provided with an adjusting device operable to adjust at least one of an intensity of the signal transmitted from the signal transmitting portion and a reception sensitivity of the signal transmitting portion with respect to the signal transmitted from the corresponding wheel.

(11) The wheel-identification-data registration assisting apparatus according to the above mode (9) or (10), further comprising a relative-movement device operable to move the signal transmitting portion and the above-indicated corresponding one wheel-side device relative to each other.

The relative-movement device is arranged to change the relative position between the signal transmitting portion and the corresponding wheel. For instance, the relative-movement device includes a relative-rotation device operable to rotate the signal transmitting portion and the wheel relative to each other about an axis of rotation of the wheel. Alternatively, the relative-movement device includes a relative-linear-movement device operable to linearly move the signal transmitting portion and the wheel relative to each other, or a relative-curvilinear-movement device operable to move the signal transmitting portion and the wheel relative to each other along a curve. The relative-linear-movement device may be arranged to effect a relative movement of the signal transmitting portion and the wheel in at least one of a direction substantially parallel to the horizontal direction, a direction substantially parallel to the vertical direction, and a direction inclined with respect to the horizontal and vertical directions. For instance, the relative movement is effected in at least one of the longitudinal and vertical direction of the vehicle, and a direction inclined with respect to the longitudinal direction of the vehicle. The relative-linear movement device may be arranged to move the signal transmitting portion along a path which passes or does not pass the axis of rotation of the wheel.

A signal transmission area in which the transmission of the signal is possible between the signal transmitting portion and the corresponding wheel-side device is determined by the directivity and reception sensitivity of the antennas of the signal transmitting portion and the wheel-side device, and the intensity of the signal transmitted from the antenna (s). Usually, the intensity of the signal transmitted from the wheel-side device and the reception sensitivity of the wheel-side device are fixed at predetermined values, so that the above-indicated signal transmission area is determined by the characteristics of the signal transmitting portion.

Where the signal transmitting portion is provided with the adjusting device as in the above mode (10), the signal transmission area can be enlarged by increasing the reception sensitivity of the signal transmitting portion with respect to the signal transmitted from the wheel-side device and/or the intensity of the signal transmitted from the signal transmitting portion.

Where the signal transmission area in which the signal transmission is possible between the signal transmitting portion and the wheel-side device when the wheel-identification-data registration assisting device is located close to the wheel is relatively large, a necessity of moving the signal transmitting portion and the wheel relative to each other is comparatively small. Where the signal transmission area is relatively small, that is, where the signal transmission is possible only when the signal transmitting portion and the wheel-side device are almost aligned with each other, it is desirable to provide the assisting device with the relative-movement device, so that the signal transmitting portion and the wheel-side device can be aligned with each other, to permit the transmission of the signal therebetween.

The signal transmission area can be enlarged by increasing the number of signal transmitters of the signal transmitting portion which are spaced apart from each other in the rotating direction of the wheel. An increase in the number of the signal transmitters reduces the time required for the wheel-side device to transmit the wheel identification after the moment of initiation of the relative rotation between the signal transmitting portion and the wheel, that is, the angle of relative rotation therebetween required for the wheel-side device to transmit the wheel identification data. Further, the increase in the number of the signal transmitters increases the opportunity of transmission of the wheel identification data from the wheel-side device during one relative rotation of the signal transmitting portion and the wheel, thereby improving the stability of transmission of the wheel identification data from the wheel-side device.

It is possible to permit the signal transmission between the signal transmitting portion and the wheel-side device, during the entire period of the relative movement therebetween, or during limited portions of the period of the relative movement in which the signal transmitting portion and the wheel-side device are relatively accurately aligned with each other. Where the assisting device is provided with the adjusting device described above with respect to the mode (10), the intensity of the signal transmitted from the signal transmitting portion and/or the reception sensitivity of the signal transmitting portion may be adjusted during the relative movement between the signal transmitting portion and the wheel.

Each wheel-identification-data registration assisting device may include a relative-movement device operable to move the wheel and the above-indicated transmission commanding portion, indicator portion, wheel-identification-data supply portion, registration assisting portion or inspection assisting portion of the assisting device, relative to each other.

(12) The wheel-identification-data registration assisting apparatus according to the above mode (11), wherein the relative-movement device includes a relative-rotation device operable to rotate the signal transmitting portion and the corresponding wheel relative to each other about an axis of rotation of the corresponding wheel.

(13) The wheel-identification-data registration assisting apparatus according to the above mode (11) or (12), wherein the relative-movement device includes a rotating device operable to rotate the signal transmitting portion.

(14) The wheel-identification-data registration assisting apparatus according to any one of the above modes (11)–(13), wherein the assisting-device control device includes (a) a relative-movement control portion operable to control the relative-movement device to establish a predetermined relative position between the signal transmitting portion and the corresponding one wheel-side device, and (b) a transmission control portion operable to command the signal transmitting portion to effect at least the above-indicated one-way transmission of the signal when the signal transmitting portion and the above-indicated corresponding one wheel-side device are located close to each other.

For example, the relative-movement control portion includes an image recognition device operable to recognize the wheel-side device or a member or area located near the wheel-side device. In this case, the relative-movement control portion controls the relative-movement device to establish the predetermined relative position (e.g., a predetermined relative angular position) between the signal transmitting portion and the wheel-side device or the above-indicated member or area which is recognized by the image recognition device. The predetermined relative position may be a relative position at which the signal transmitting portion and the wheel-side device are located close to each other and in the above-indicated signal transmitting area.

The transmission control portion is arranged to command the signal transmitting portion to effect the transmission of the signal when the predetermined relative position between the signal transmitting portion and the wheel-side device is established. For instance, the transmission control portion disenables the signal transmitting portion to effect the signal transmission when the predetermined relative position is not established, and enables the signal transmitting portion to effect the signal transmission when the predetermined relative position is established. Alternatively, the transmission control portion places the signal transmitting portion in a low-capacity state (by reducing the intensity of the signal transmitted therefrom, or the reception sensitivity) when the predetermined relative position is not established, and in a high-capacity state (by increasing the intensity of the signal transmitted, or the reception sensitivity) when the predetermined relative position is established.

The arrangement of the transmission control portion described above makes it possible to reduce the amount of electric energy required for the signal transmission.

(15) The wheel-identification-data registration assisting apparatus according to any one of the above modes (1)–(14), further comprising a supporting device arranged to support the vehicle and the plurality of wheel-identification-data registration assisting devices such that the plurality of wheel-identification-data registration assisting devices have respective predetermined positions relative to the vehicle.

The supporting device is arranged such that when the vehicle is mounted on the supporting device at a predetermined position relative to the supporting device, the plurality of wheel-identification-data registration assisting devices are located close to the respective wheels.

(16) The wheel-identification-data registration assisting apparatus according to the above mode (15), wherein the supporting device includes (a) a main body, (b) a movable member which supports each of the plurality of wheel-identification-data registration assisting devices and which is supported by the main body such that the movable member is movable in a direction substantially parallel to an axis (P) of rotation of the wheel corresponding to each wheel-identification-data registration assisting device, and (c) a positioning device operable, when the vehicle is located at a predetermined position relative to the main body, to move the movable member for thereby moving each wheel-identification-data registration assisting device toward and away from each other.

For example, the positioning device is arranged to normally hold each wheel-identification-data registration assisting device at a standby position spaced from the corresponding wheel, and move the assisting device to a predetermined operating position close to the wheel, when the assisting device is operated to assist the above-indicated system.

(17) The wheel-identification-data registration assisting apparatus according to the above mode (15) or (16), wherein the supporting device is provided with a wheel-rotation permitting device which permits each of the wheels to be rotated while the vehicle is located at a predetermined position relative to the main body.

The vehicle is supported by the supporting device such that the plurality of wheels are rotatable. In this condition, the drive wheels of the vehicle can be rotated by a drive power source provided on the vehicle, or each wheel of the vehicle can be rotated by a wheel drive device provided on the supporting device.

The vehicle need not be supported by the supporting device such that the wheels are in contact with the main body. Where the vehicle is supported with its wheels held in a non-contact relationship with the main body, the drive wheels can be rotated by the drive power source provided on the vehicle, or each wheel can be manually rotated.

(18) The wheel-identification-data registration assisting apparatus according to any one of the above modes (15)–(17), wherein the supporting device includes a plurality of rollers disposed for each of the wheels while the vehicle is located at a predetermined position relative to the main body, so as to be held in contact with each wheel, and a roller drive device operable to rotate the plurality of rollers.

Where the vehicle is supported by the supporting device such that the wheels are in contact with the rollers, the wheels are rotated when the rollers in contact with the wheels are rotated by the roller drive device.

The roller drive device may be provided to rotate only the rollers provided for the non-drive wheels of the vehicle. In this case, the vehicle drive wheels in contact with the rollers are rotated by the drive power source provided on the vehicle.

(19) The wheel-identification-data registration assisting apparatus according to any one of the above modes (1)–(18), wherein each of the plurality of wheel-side devices includes (a) a wheel-state detecting portion operable to detect a state of a corresponding one of the wheels, and (b) a wheel-side information transmitting device operable to transmit wheel-side information including wheel-state data representative of the state of the above-indicated corresponding one wheel detected by the wheel-state detecting portion, and the wheel identification data identifying the corresponding one wheel, and wherein the body-side device includes (i) an information receiving device operable to receive the wheel-side information transmitted from each wheel-side device, (ii) a memory for storing the information corresponding to the wheel identification data of each of the wheels, and (iii) a wheel-state obtaining portion operable to obtain the state of the each wheel identified by the wheel identification data, on the basis of the wheel-state data, when the wheel-state obtaining portion determines, on the basis of the wheel identification data received by the information receiving device and the information corresponding to the wheel identification data stored in said memory, that the wheel-side information received by the information receiving device are the information of each wheel identified by the wheel identification data received by the information receiving device.

The wheel-state detecting portion may be arranged to detect an air pressure in a tire of the wheel, a temperature of the tire, or a force acting on the tire.

The wheel-side information includes the wheel-state data representative of the state of the wheel, and the wheel identification data identifying the wheel.

(20) The wheel-identification-data registration assisting apparatus according to any one of the above modes (1)–(19), wherein each of the plurality of wheel-identification-data registration assisting devices is supported by a main body of a wheel inspecting device which is operable to detect a state in which the wheel corresponding to each wheel-identification-data registration assisting device is mounted on the vehicle.

In the apparatus according to the above mode (20) wherein each wheel-identification-data registration assisting device is supported by the wheel inspecting device, the inspection of the state of each wheel and the operation to register the wheel identification data for that wheel can be effected concurrently or continuously, so that the total time required for the inspection and the registration can be significantly reduced.

To detect the states of the wheels, the wheel inspecting device is required for each of the wheels. Therefore, it is advantageous to mount each wheel-identification-data registration assisting device on the main body of the corresponding wheel inspection device.

It is also noted that the state in which each wheel is mounted on the vehicle is usually inspected by rotating the wheel. Namely, the inspection of the wheels is usually effected while the vehicle is supported on a supporting device provided with a wheel rotating device provided to rotate each wheel. Accordingly, this wheel rotating device can be effectively utilized to rotate the wheel and the signal transmitting portion {described above with respect to the mode (9)} relative to each other.

The wheel inspecting device may be arranged to detect at least one of a toe angle and a camber angle of the corresponding wheel. The wheel inspecting device may be of a contact type arranged to be in contact with the wheel when the wheel inspecting device is operated to detect the state of the wheel, or of a non-contact type operable to detect the wheel state, without a contact with the wheel.

(21) The wheel-identification-data registration assisting apparatus according to any one of the above modes (1)–(20), wherein each of the plurality of wheel-identification-data registration assisting devices is supported by a main body of a wheel adjusting device operable to adjust a state in which the wheel corresponding to each wheel-identification-data registration assisting device is mounted on the vehicle.

The wheel adjusting device and the wheel inspecting device may be supported on the common main body. That is, the wheel adjusting device may also function as the wheel inspecting device, or the wheel inspecting device may also function as the wheel adjusting device.

(22) The wheel-identification-data registration assisting apparatus according to any one of the above modes (1)–(21), wherein the assisting-device control device includes a registration-state obtaining device operable to obtain a state of the operation of the body-side device associated with the registration of the information corresponding to the wheel identification data.

In the apparatus according to the above mode (22), the state of the operation of the body-side device associated with the registration of the information corresponding to the wheel identification data is obtained by the registration-state obtaining device of the assisting-device control device.

Where the registration-state obtaining device is arranged to obtain the state of registration of the information corresponding to the wheel identification data, for example, the plurality of wheel-identification-data registration assisting devices are controlled by the assisting-device control device on the basis of the obtained state of registration of the above-indicated information. Described more specifically, the assisting devices are controlled to assist the body-side device to register corresponding sets of information corresponding to the wheel identification data corresponding to the respective wheels (front right, front left, rear right and rear left wheel), one after another, in a predetermined order, such that the registration of the information of one of the wheels is followed by the registration of the information of another wheel. Further, the assisting-device control device may be provided with an indicator device (e.g., a display device) operable to indicate the state of registration of the information, so that the operator or worker observing an indication given on the indicator device may manipulate the assisting device corresponding to the wheel whose information is to be registered next.

Where the assisting devices are operated to register the information corresponding to the wheel identification data for the respective wheels, in a predetermined order according to a predetermined rule, the registration-state obtaining device may be arranged to obtain information indicative of any of the wheels for which the information corresponding to the wheel identification data has not been registered, after termination of the series of operation of the body-side device to register the information.

Further, the assisting devices may be controlled by the assisting-device control device in a manner as described above, also when the state of inspection of the registered information is obtained by the registration-state obtaining device. Namely, a result of inspection as to whether the registered information corresponds to each wheel identified by the received wheel identification data is obtained by the registration-state obtaining device. This inspection may be effected for the wheels one after another.

The assisting-device control device is preferably connected to the body-side device through a signal line, and is preferably provided with an indicator device.

(23) A wheel-identification-data registration assisting apparatus operable with a system including a body-side device disposed on a body of a vehicle and a plurality of wheel-side devices disposed on respective wheels of the vehicle, said apparatus being operable to assist the system in an operation associated with registration in the body-side device of information corresponding to wheel identification data which identify each of the plurality of wheel-side devices and which are transmitted from each wheel-side device, the wheel-identification-data registration assisting apparatus comprising:

a plurality of wheel-identification-data registration assisting devices, each operable when located close to the wheels, respectively, to assist the system in at least a portion of a series of operation of the above-indicated system from transmission of the wheel identification data from a corresponding one of the plurality of wheel-side devices to the registration of the information corresponding to the wheel identification data in the body-side device; and an assisting-device control device operable to control the plurality of the wheel-identification-data registration assisting devices.

The wheel-identification-data registration assisting apparatus according to the above mode (23) may include any one of the technical teaches of the above modes (1)–(22).

(24) The wheel-identification-data registration assisting apparatus according to the above mode (1), wherein each of the plurality of wheel-identification-data registration assisting devices include a wheel-identification-data inspection assisting device operable to assist the above-indicated system in an operation associated with inspection of a state of registration in the body-side device of the information corresponding to the wheel identification data, and the assisting-device control device includes a control portion operable to control the wheel-identification-data inspection assisting device.

The wheel-identification-data registration assisting apparatus according to the above mode (24) may include any one of the technical teaches of the above modes (1)–(23).

(25) The wheel-identification-data registration assisting apparatus according to the above mode (24), wherein the wheel-identification-data inspection assisting device is operable to assist the system in inspecting the information corresponding to the wheel identification data registered in the body-side device.

(26) The wheel-identification-data registration assisting apparatus according to the above mode (25), wherein the wheel-identification-data inspection assisting device is operable to assist the above-indicated system in checking if the information registered in the body-side device correctly identifies each wheel-side device from which the body-side device has received the wheel identification data from each wheel-side device.

(27) The wheel-identification-data registration assisting apparatus according to the above mode (1), wherein each of the plurality of wheel-identification-data registration assisting devices includes a wheel-identification-data supply assisting device operable to assist the above-indicated system in at least a portion of a series of operation of the system from transmission of the wheel identification data from a corresponding one of the plurality of wheel-side devices to reception of the wheel identification data by the body-side device, and the assisting-device control device includes a control portion operable to control the wheel-identification-data supply assisting device.

In the wheel-identification-data supply assisting apparatus according to the above mode (27), the supply of the wheel identification data from each wheel-side device to the body-side device for some purpose or other is assisted by the corresponding wheel-identification-data supply assisting device. The present supply assisting device is operated to assist the system when the wheel identification data are registered in the body-side device, when the wheel identification data registered in the body-side device are inspected, or when the assistance is requested by the body-side device.

The wheel-identification-data registration assisting apparatus according to the above mode (27) may include any one of the technical teaches of the above modes (1)–(26).

(28) An identification-data registration assisting apparatus operable with a system including an information processing device and a remote detecting device operable to detect a state of a vehicle and transmit in a wireless fashion vehicle-state data representative of the detect state of the vehicle and identification data identifying the remote detecting device, the apparatus being operable to assist the system in an operation of the system associated with registration in the information processing device of information corresponding to the identification data, the apparatus comprising:

an identification-data registration assisting device, operable when located close to the remote detecting device while the vehicle is located at a predetermined position, to assist the above-indicated system in at least a portion of a series of operation of the system to register the information corresponding to the identification data in the information processing device; and an assisting-device control device operable to control the identification-data registration assisting device.

The identification-data registration assisting apparatus according to the above mode (28) can be used to register in the information processing device the information corresponding to the identification data identifying the remote detecting device, where the transmission of information is effected between the remote detecting device and the information processing device.

The remote detecting device is not necessarily disposed on a rotary member, and may be disposed on a non-rotary member located at a position at which the remote detecting device cannot be easily connected to the information processing device through a signal line.

The remote detecting device may be provided at one position on the vehicle, or at each of a plurality of positions on the vehicle. Each remote detecting device may be a wheel-side device disposed on a corresponding one of wheels of the vehicle.

The identification-data registration assisting apparatus according to the above mode (28) may include any one of the technical features of the above modes (1)–(27).

(29) A data-processing-information registration assisting apparatus operable with a system including an information processing device and a remote detecting device including a vehicle-state detecting portion operable to detect a state of a vehicle, the apparatus being operable to assist the system in an operation associated with registration, in at least one of the remote detecting device and the information processing device, of information corresponding to data-processing information used to process vehicle-state data representative of the state of the vehicle, the data-processing-information registration assisting apparatus comprising:

a data-processing-information registration assisting devices operable when the vehicle is located at a predetermined position and when the data-processing-information registration assisting device is located close to the remote detecting device disposed on the vehicle, the data-processing-information registration assisting device operating to assist the system in at least a portion of the operation associated with the registration of the information corresponding to the data-processing information in the above-indicated at least one of the remote detecting device and the information processing device; and an assisting-device control device operable to control the data-processing-information registration assisting device.

The "data-processing information used to process vehicle-state data representative of the state of the vehicle" may be information used for transmission of the vehicle-state data between the remote detecting device and the information processing device, and/or information used for at least one of the remote detecting device and the information processing device to evaluate the state of the vehicle.

The information used for transmission of the vehicle-state data may be at least one of identification data identifying the remote detecting device; information representative of a data transmitting program used for the remote detecting device to transmit the vehicle-state data; and information representative of a data receiving program used for the information processing device to receive the vehicle-state information. These kinds of information may be referred to as "transmission-related information". The identification data identifying the remote detecting device are transmitted from the remote detecting device, and the information processing device receives the transmitted identification data and register information corresponding to the received identification data. The information representative of the data transmitting program may be transmitted from the information processing device, and registered in the remote detecting device, and the information representative of the data receiving program may be transmitted from the remote detecting device and registered in the information processing device. The manner of transmission of information between the remote detecting device and the information processing device may be determined by the specific arrangement of the remote detecting device.

The information used to evaluate the state of the vehicle may be a threshold value used to determine whether the state of the vehicle is normal or not, and/or an initial value indicative of the vehicle state where a state of change of the vehicle state is obtained. These threshold value and the initial value of the vehicle state may be referred to as "evaluation information". The "transmission-related information" may be considered to include the threshold value used by the remote detecting device to determine whether the vehicle state is normal or not, and the initial value of the vehicle state, since these threshold value and initial value are required for the remote detecting device to transmit the information indicating whether the vehicle state is normal or not and the information indicative of a change of the vehicle state.

It is also noted that the vehicle state may be evaluated by the information processing device. In any case, the threshold value data are often registered or stored in one of the remote detecting device and the information processing device, so that the threshold value data are transmitted from one of these devices to the other, and registered in this other device. The initial value data of the vehicle state are transmitted from the remote detecting device and registered or stored in the information processing device.

The data-processing information transmitted from one of the remote detecting device and the information processing device may be identical with or different from the information corresponding to the data-processing information which is registered in the other device.

The state of the vehicle is obtained by the information processing device by transmission of the vehicle-state data from the remote detecting device to the information processing device. In this respect, the information processing device and the remote detecting device are considered to constitute a vehicle-state obtaining device operable to obtain the vehicle state.

The data-processing-information registration assisting apparatus according to the above mode (28) may include any one of the technical features of the above modes (1)–(28).

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Referring to the accompanying drawings, there will be described several embodiments of a wheel-identification-data registration assisting apparatus of this invention for a motor vehicle, which apparatus is one form of a data-processing-information registration assisting apparatus operable to assist the registration of data-processing information used to process vehicle-state data representative of a state of the motor vehicle.

Figure 1:
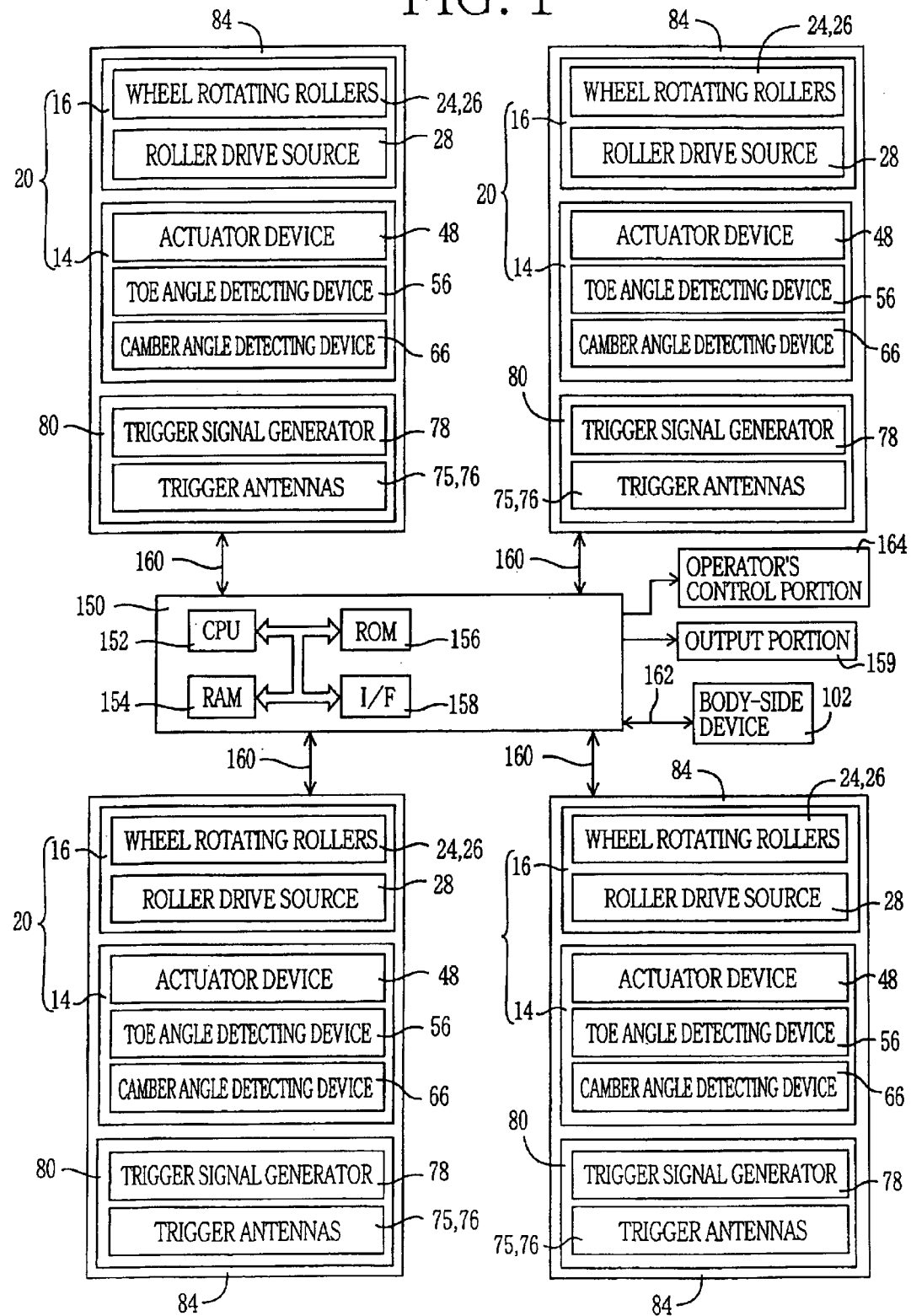
FIG. 1 is a block diagram schematically showing an overall arrangement of a wheel-identification-data registration assisting apparatus constructed according to one embodiment of this invention, as one form of a data-processing-information registration assisting apparatus.
Figure 2:
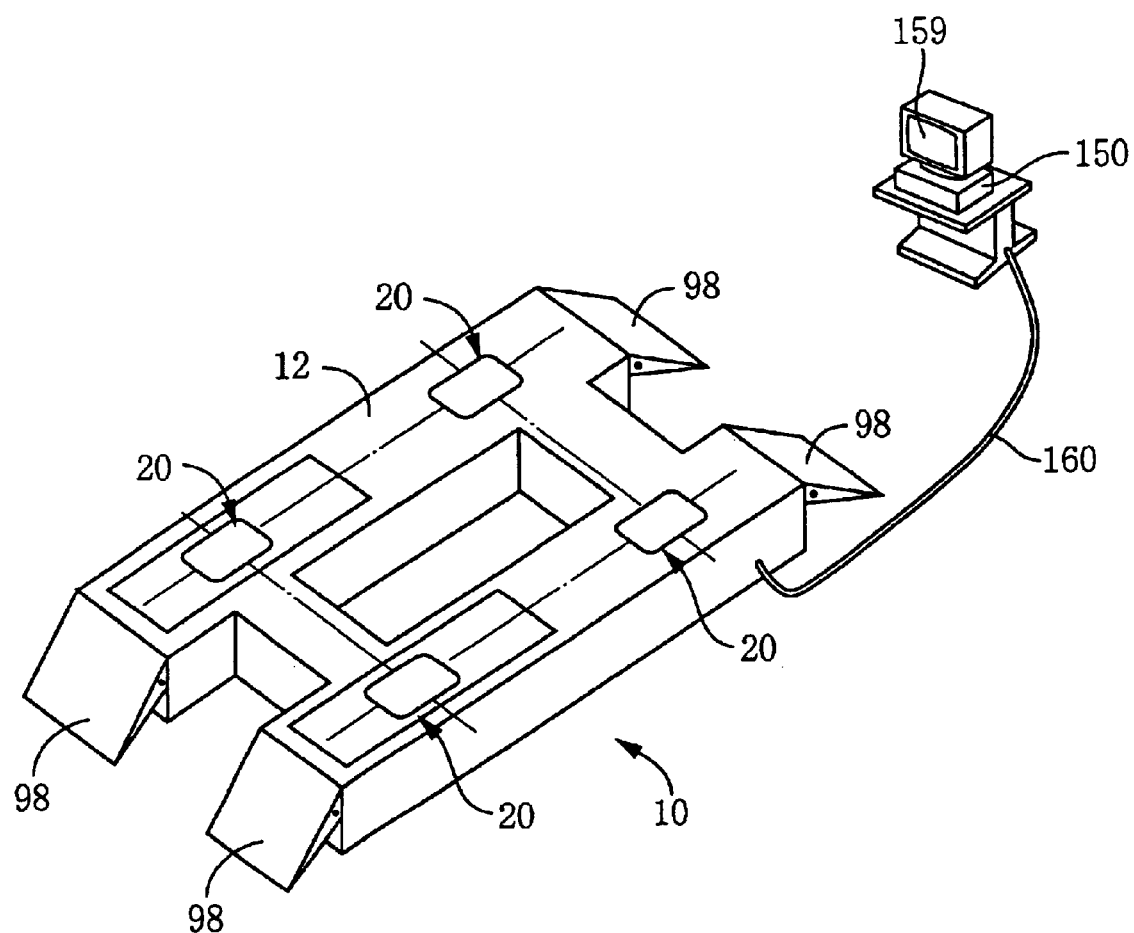
FIG. 2 is a perspective view schematically illustrating an arrangement of a vehicle mounting device provided with the wheel-identification-data registration assisting apparatus.

Referring to FIG. 2, there is shown a supporting device in the form of a vehicle mounting device 10 including a main body 12 on which the motor vehicle is to be positioned so that wheels of the vehicle are inspected. The main body 12 is provided with four wheel inspecting devices 14 (shown in FIG. 1) corresponding to the respective four wheels, and four wheel rotating devices 16 (also shown in FIG. 1). The wheel inspecting device 14 and the wheel rotating device. 16 which are provided for each of the four wheels cooperate to constitute a wheel inspecting unit 20. The four wheel inspecting devices 14 and the four wheel rotating devices 16 are aligned with the respective wheels of the vehicle which is mounted on the main body 12 at a predetermined position relative to the main body 12.

In the present embodiment, each pair of wheel inspecting units 20 which are spaced from each other in the width direction of the main body 12 (in the transverse direction of the vehicle mounted on the main body 12) is movable relative to the main body 12 in the length direction of the main body 12 (in the longitudinal direction of the vehicle), so that the vehicle having any wheelbase (any distance between the center of the front wheels and the center of the rear wheels) can be inspected of its wheels (toe angles and other states of the wheels) by the four inspecting units 20.

Figure 3:
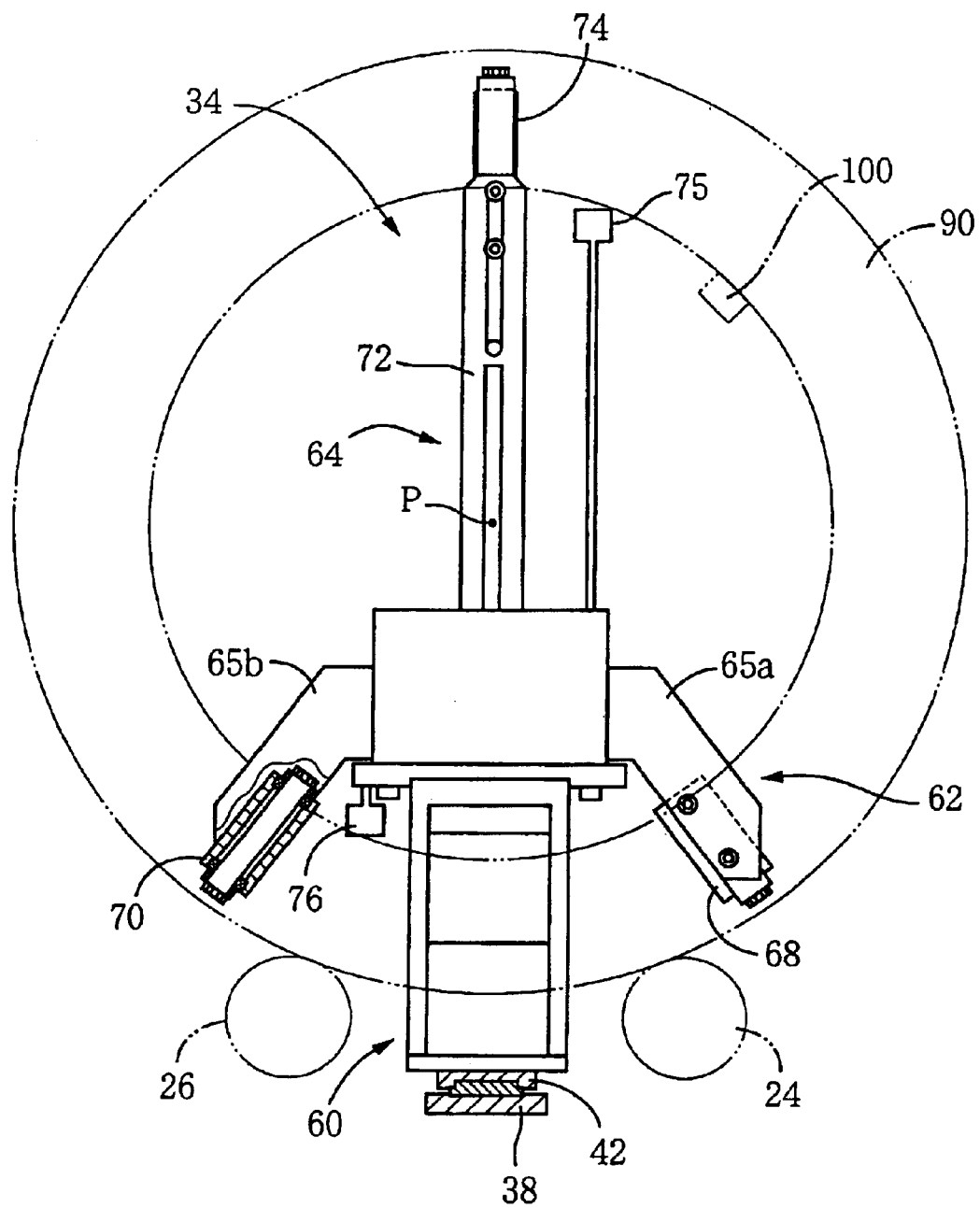
FIG. 3 is a view showing a wheel-identification-data registration assisting device of the wheel-identification-data registration assisting apparatus.

Each of the four wheel rotating devices 16 includes two wheel rotating rollers 24, 26 shown in FIG. 3, and a roller drive source 28 (shown in FIG. 1) arranged to rotate the two rollers 24, 26. The roller drive source 28 includes an electric motor operable to rotate the two wheel rotating rollers 24, 26, so that the corresponding wheel held in contact with the rollers 24, 26 is rotated without an operation of a drive power source (e.g., an internal combustion engine) provided on the vehicle. The roller drive device 28 may include two electric motors operable to rotate the respective rollers 24, 26, rather than a single common electric motor operable to rotate both of the rollers 24, 26.

Figure 4:
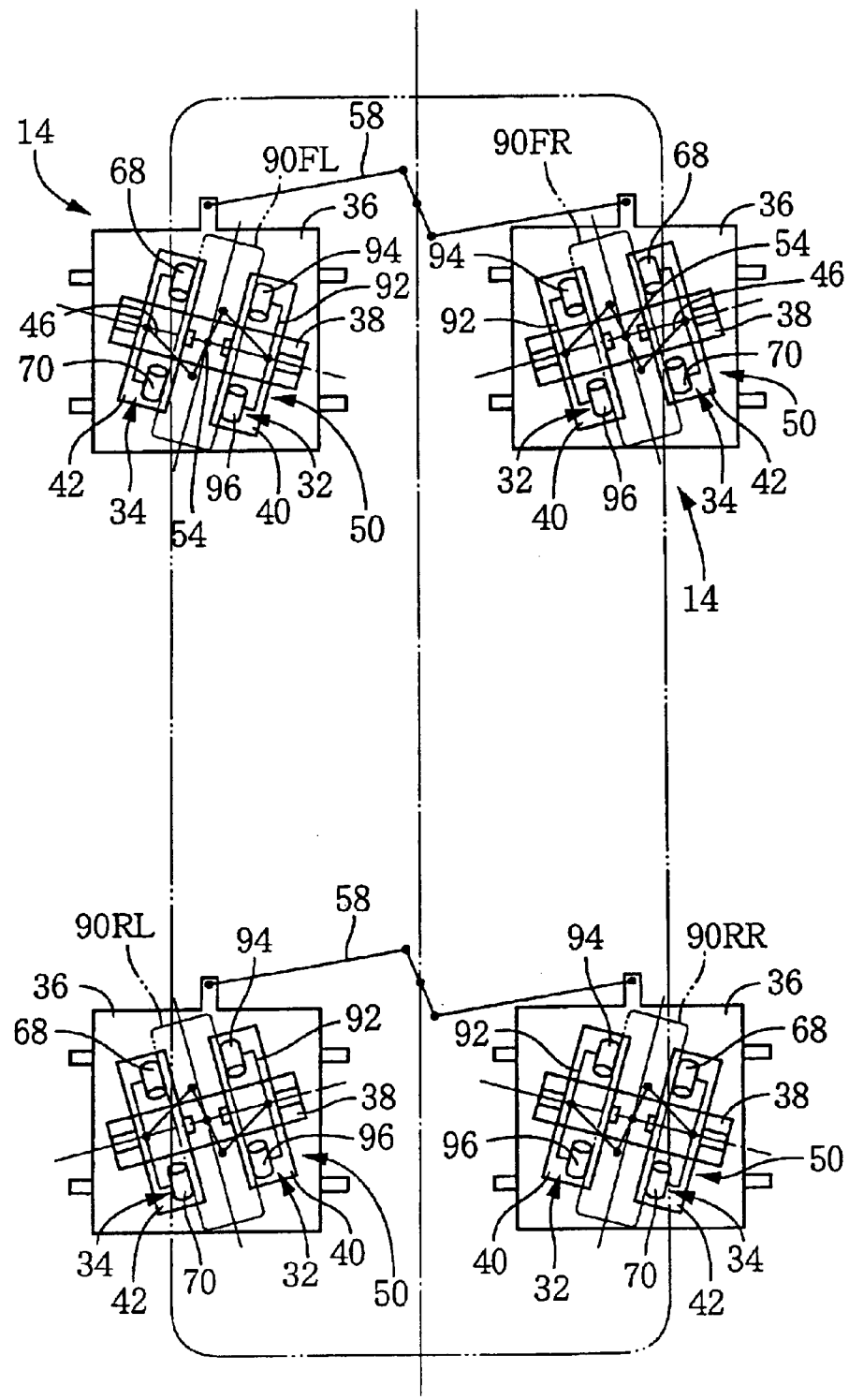
FIG. 4 is a view schematically showing a wheel inspecting device of the wheel-identification-data registration assisting device, which is mounted on the vehicle mounting device of FIG. 2.

Each of the wheel inspecting devices 14 includes an inner roller-holder portion 32 and an outer roller-holder portion 34, as shown in FIGS. 3 and 4. Namely, four base plates 36 are disposed on the main body 12 such that each base plate 36 is moved in the width direction of the main body 12, and two movable members 40, 42 are attached to a pivotable plate 38 pivotally connected to each base plate 36 such that the movable members 40, 42 are pivotable relative to the base plate 36. The two holder portions 32, 34 are attached to the respective two movable members 40, 42.

The two movable members 40, 42 are connected to each other by a link mechanism 46, and are movable toward and away from each other by an actuator device 48 (shown in FIG. 1). That is, the two movable members 40, 42 are moved in synchronization with each other by an operation of the actuator device 48. Thus, the movable members 40, 42, link mechanism 46 and actuator device 48 cooperate with each other to constitute a positioning device 50 operable to move the inner and outer roller-holder portions 32, 34 toward and away from each other.

The positioning device 50 may include cylinders or an electric motor. Where the positioning device 50 includes cylinders, the two movable members 40, 42 are moved toward and away from each other with advancing and retracting movements of respective two pistons, when a pressurized fluid is applied to a selected one of two fluid chambers formed on the opposite sides of each piston. In this case, the positioning device 50 is constituted by the movable members 40, 42, cylinders, control valves for controlling the fluid flows into and from the fluid chambers, and a hydraulic pressure source. Where the positioning device 50 includes an electric motor, the movable members 40, 42 is moved toward and away from each other by a rotary motion of the electric motor. In this case, the positioning device 50 is constituted by the movable members 40, 42, electric motor, a motor driver circuit, and a motion converting device arranged to convert the rotary motion of the electric motor into linear motions of the movable members 40, 42.

On the other hand, the pivotable plate 38 is fixed to a pivot shaft 54 which is supported by the base plate 36 such that the pivotable plate 38 is pivotable with the pivot shaft 54 which is rotatable about its vertically extending axis relative to the base plate 36. An angle of rotation of the pivot shaft 54 relative to the base plate 36 is detected by a toe angle detecting device 56 (shown in FIG. 1).

The two base plates 36 which correspond to the respective front wheels of the vehicle and which are spaced from each other in the width direction of the main body 12 of the vehicle mounting device 10 are connected to each other by a link mechanism in the form of an equalizer 58. Another equalizer 58 is used to connect the two base plates 36 corresponding to the respective rear wheels of the vehicle. These equalizers 58 permit the vehicle to be positioned on the vehicle mounting device 10 such that the widthwise centerline of the vehicle mounted on the main body 12 is aligned with the widthwise centerline of the main body 12.

As shown in FIG. 3, the outer roller-holder portion 34 includes a main body 60 fixed to the movable member 42, and a first roller holder 62 and a second roller holder 64 which are pivotable relative to the main body 60 about a horizontally extending pivot axis. The first roller holder 62 has two arms 65a, 65b which are inclined relative to the vertical axis such that a distance between the two arms 65a, 65b increases as the arms extend downwards. The two arms 65a, 65b have respective rollers 68, 70 at their free or lower end portions such that the rollers 69, 70 are rotatable relative to the arms 65a, 65b. The second roller holder 64 has a single arm 72 which extends in the vertical direction and which has a roller 74 at its upper end portion such that the roller 74 is rotatable relative to the arm 72. These first and second roller holders 62, 64 are pivotable as a unit about the horizontal pivot axis. An angle of pivoting of the roller holders 62, 64 is detected by a camber detecting device 66.

The main body 60 is provided with two trigger antennas 75, 76, which are located at respective angular positions of the corresponding wheel, as shown in FIG. 3. To these trigger antennas 75, 76, there is connected a trigger signal generator 78 (shown in FIG. 1), which is arranged to generate a trigger signal. The generated trigger signal is transmitted from the trigger antennas 75, 76. The trigger antennas 75, 76 and the trigger signal generator 78 cooperate to constitute a trigger device 80 (shown in FIG. 1).

The first and outer roller holders 62, 64 of the outer roller-holder portion 34 fixed to the movable member 42 and located in an opposed relation with the corresponding wheel 90 are positioned such that the two rollers 68, 70 held by the first roller holder 62 are located at relatively low positions of the wheel 90 while the roller 74 held by the second roller holder 64 is located at an almost uppermost position of the wheel 90, as shown in FIG. 3. In this condition, the two trigger antennas 75, 76 are located at respective two angular positions of the wheel 90 which are spaced from each other by 180° in the circumferential or rotating direction of the wheel 90 which has a rotation axis P.

The inner roller-holder portion 32 (which will not be described in detail) has a roller holder 92 which is pivotable relative to its main body about a horizontally extending pivot axis. The roller holder 92 corresponds to the first roller holder 62 of the outer roller-holder portion 34, and includes two arms having respective rollers 94, 96 such that the rollers 94, 96 are rotatable relative to the arms. The roller holder 92 of the inner roller-holder portion 32 fixed to the movable member 40 and located in an opposed relation with the wheel 90 is positioned such that the rollers 94, 96 are located at relatively low positions of the wheel 90, which are substantially aligned with the positions of the rollers 68, 70 of the outer roller-holder portion 34. The rollers 68, 70, 74, 94, 96 have rotation axes extending in the radial direction of the wheel 90.

The main body 12 of the vehicle mounting device 10 is provided with four ramps 98 such that the two front ramps 98 are located at the front end of the main body 12 while the rear two ramps 98 are located at the rear end of the main body 12. The distance of the right and left ramps 98 is determined to permit the right and left wheels of the vehicle to roll on the ramps 98 when the vehicle is mounted on the vehicle mounting device 10.

The vehicle mounted on the main body 12 with the wheels rolling on the ramps 98 is positioned such that each wheel 90 is held in contact with the circumferential surfaces of the wheel rotating rollers 24, 26. With the vehicle thus mounted at a predetermined position on the main body 12, the wheel rotating rollers 24, 26 can be rotated by the roller drive source 28, to rotate the four wheels 90 without an operation of the drive power source provided on the vehicle.

The positioning device 50 provided for each wheel inspecting device 14 is operated to move the outer and inner roller-holder portions 34, 32 toward each other, until the corresponding wheel 90 is held by and between the rollers 68, 70, 74 of the outer roller-holder portion 34 and the rollers 94, 96 of the inner roller-holder portion 32, which are located on the respective opposite sides (outer and inner sides) of the wheel 90. In this instance, the wheel 90 is gripped by the outer and inner roller-holder portions 34, 32, at a longitudinally central portion of the pivotable plate 38. Further, the widthwise centerline of the vehicle each wheel 90 of which has been gripped is brought into alignment with the widthwise centerline of the main body 12 of the vehicle mounting device 10, by means of the equalizers 58.

The first and second roller holders 62, 64 of the outer roller-holder portion 34 and the roller holder 92 of the inner roller-holder portion 32 are pivoted about the horizontal axis, by an angle corresponding to the camber angle of each wheel 90. In the present embodiment, the angle of pivoting of the first and second roller holders 62, 64 about the pivot axis is detected as the camber angle of the wheel 90 by the camber angle detecting device 66. In addition, the pivotable plate 38 is pivoted depending upon the toe angle of the wheel 90. The angle of pivoting of the pivotable plate 38 is detected as the camber angle of the wheel 90 by the toe angle detecting device 56. The manners of detection of the toe angle and camber angle of the wheel are disclosed in JJP-A-7-208904. If the right and left wheels are closer together at the front than at the rear, it is called "toe in". If the two wheels are farther apart at the front than t the rear, it is called "toe-out".

In the present embodiment, each wheel 90 is rotated at a relatively low velocity {for example, at an angular velocity (radian/sec) of about $\pi/2$}, while the wheel 90 is held in rolling contact with the outer and inner roller-holder portions 34, 32. An amount of change of the angle of pivoting of the pivotable plate 38 during rotation of the wheel 90 is detected as a run-out angle. Although the run-out angle may be detected during one full turn of the wheel 90, the present embodiment is arranged such that the wheel 90 is rotated by two and a half turns, to effect statistical processing of the output signal of the toe angle detecting device 56. The run-out angle may be taken into account when the toe angle of the wheel 90 is obtained.

Figure 5:
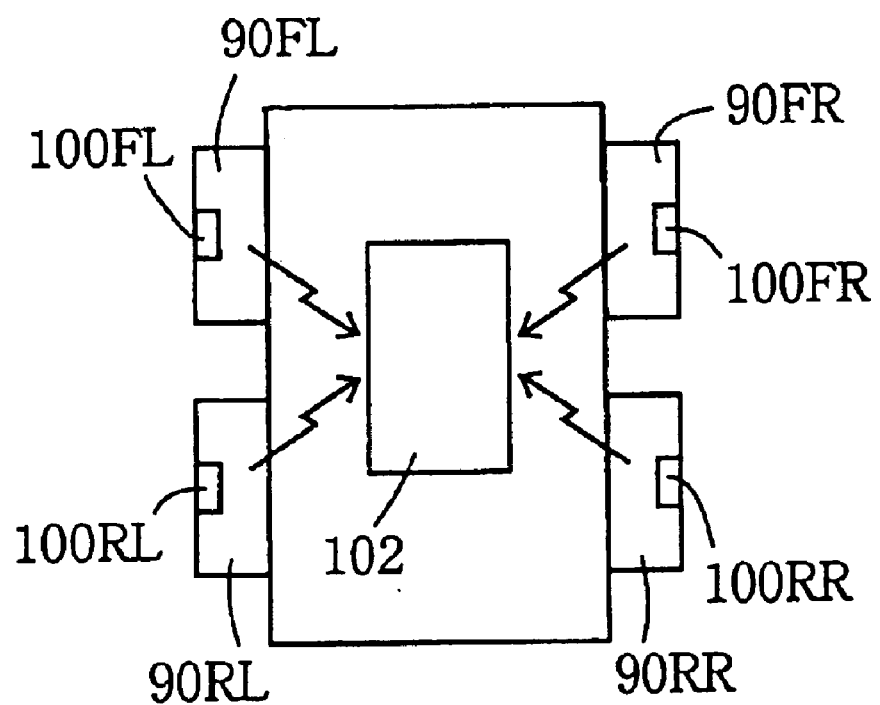
FIG. 5 is a view illustrating a vehicle provided with a vehicle-state obtaining apparatus.
Figure 6:
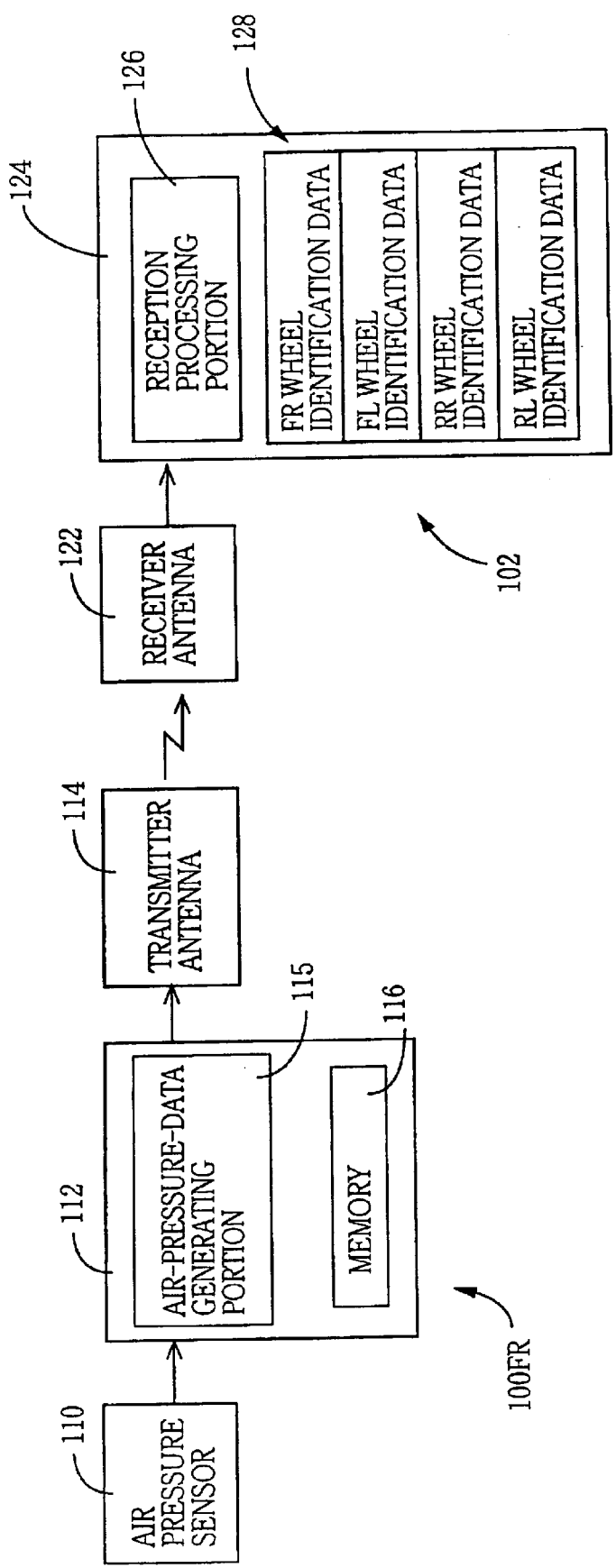
FIG. 6 is a view schematically showing wheel-side devices and a body-side device which are included in the vehicle-state obtaining apparatus.

As shown in FIGS. 5 and 6, the vehicle is provided with four wheel-side devices 100FR, 100FL, 100RR and 100RL disposed on respective front right, front left, rear right and rear left wheels 90FR, 90FL, 90RR and 90RL. One of the wheel-side devices 100 is shown in FIG. 3. The vehicle is further provided with a body-side device 102 disposed on a member of the vehicle body. Data communication in a wireless fashion is effected between the body-side device 102 and each of the wheel-side devices 100FR, 100FL, 100RR, 100RL. Since all of the wheel-side devices 100FR, 100FL, 100RR, 100RL are identical in construction with each other, the wheel-side device 100FR will be described by way of example. The following description of the wheel-side device 100FR is applicable to the other wheel-side devices 100FL, 100RR and 100RL.

The wheel-side device 100FR includes an air pressure sensor 110, a control device 112, and a transmitter antenna 114. The control device 112 includes an air-pressure-data generating portion 115, and a memory 116 for storing wheel identification data. The air pressure sensor 110 is arranged to detect an air pressure in a tire of the wheel 90FR, and the air-pressure-data generating portion 115 of the control device 112 is arranged to generate air pressure data indicative of the air pressure detected by the air pressure sensor 110. The generated air pressure data are transmitted from the transmitter antenna 114 to the body-side device 102, together with the wheel identification data identifying the front right wheel 90FR. Namely, wheel-side information is transmitted from the transmitter antenna 114. The wheel-side information includes at least one of the air pressure data and the wheel identification data. Since the wheel-side device 100FR is attached to the front right wheel 90FR, the position of the wheel-side device 100FR relative to the vehicle body cyclically changes during each rotation of the front right wheel 90FR.

The body-side device 102 includes a receiver antenna 122 and a wheel-information processing device 124. The wheel-information processing device 124, which is principally constituted by a computer incorporating a CPU, a ROM, a RAM and an input/output interface (I/F), includes a reception processing portion 126 and a memory 128. The memory 128 is provided to store or register the wheel identification data received from the four wheel-side devices 100. When the wheel-information processing device 124 receives the wheel-side information through the receiver antenna 122, the reception processing portion 126 extracts the wheel identification data from the received wheel-side information, and determines whether the extracted wheel identification data are coincident with the wheel identification data stored in the memory 128. If the extracted wheel identification data are coincident with the stored wheel identification data, the air pressure represented by the air pressure data included in the received wheel-side information is determined as the air pressure of the tire of the wheel 90 corresponding to the wheel-side device 100 from which the wheel-side information has been received.

The body-side device 102 is operable in a selected one of a wheel-identification-data registering mode and an air-pressure-data obtaining mode. In the wheel-identification-data registering mode, the received wheel identification data are registered in the memory 128. In the air-pressure-data obtaining mode, the air pressure data are extracted from the received wheel-side information.

For example, the body-side device 100 is placed in the wheel-identification-data registering mode when no wheel identification data are stored in the memory 128. In this case, the wheel-identification-data registering mode is changed to the air-pressure-data obtaining mode when the wheel identification data for all of the four wheels 90 have been stored in the memory 128. Alternatively, a mode selector switch may be provided on the body-side device 100, to enable the worker to select the desired one of the wheel-identification-data registering mode and the air-pressure-data obtaining mode. Further alternatively, the body-side device 100 is arranged to receive a mode selector signal from an external device, to select the wheel-identification-data registering mode or the air-pressure-data obtaining mode.

The wheel-identification-data registration assisting apparatus according to the present embodiment of this invention includes a control device 150 shown in FIGS. 1 and 2. As shown in FIG. 1, the control device 150 is principally constituted by a computer incorporating a CPU 152, a ROM 154, a RAM 156, and an input/output interface (I/F) 158. To the I/F 158, there are connected through signal lines 160, 162 the wheel inspecting units 20 provided for the respective wheels 90, and the body-side device 102. Further, an output portion 159 is connected to the I/F 158, as shown in FIGS. 1 and 2. The control device 150 is arranged to control the wheel inspecting units 20 according to a predetermined wheel-state detecting program, and to control the trigger devices 80 according to a predetermined wheel-identification-data registration assisting program illustrated in the flow chart of FIG. 7. The control device 150 is further arranged to obtain information as to whether the wheel identification data for each wheel 90 have been registered in the body-side device 102. The output portion 159 may be a display device or a printer.

In the present embodiment, the registration of the wheel identification data in the body-side device 102 is effected concurrently with the inspection of each wheel for its toe angle, camber angle and run-out angle.

For inspecting the wheels 90 and registering the wheel identification data for the wheels 90, the vehicle is mounted on the vehicle mounting device 10 at the predetermined position, and each wheel 90 is held by the outer and inner roller-holder portions 34, 32. In this condition, each wheel 90 is slowly rotated by the corresponding wheel rotating device 16. The toe angle, camber angle and run-out angle of the wheel 90 are detected during two and a half turns of the wheel 90.

During rotation of the wheel 90, the wheel-side device 100 is rotated relative to the trigger antennas 75, 76, so that the wheel-side device 100 is alternately brought into alignment with the trigger antennas 75, 76. In response to trigger signals generated by the trigger antennas 75, 76, the wheel-side information including the wheel identification data and the air pressure data is transmitted from the wheel-side device 100, and is stored or registered in the memory 128 of the body-side device 102 placed in the wheel-identification-data registering mode. Since the two trigger antennas 75, 76 are spaced from each other by 180° in the rotating direction of the wheel 90, one of the antennas 75, 76 is aligned with the wheel-side device 100 during each rotary motion of 180° of the wheel 90, and the wheel-side information is transmitted to the body-side device 102.

Accordingly, the wheel identification data of all of the four wheels 90 can be sequentially registered in the memory 128 of the body-side device 102, during two full turns (180°×4) of the wheels 90, that is, while the wheels 90 are inspected for their toe, camber and run-out angles.

Where the registration of the wheel identification data is effected concurrently on a plurality of vehicles mounted on the vehicle mounting devices 10 arranged side by side, it is desirable to interpose suitable shielding structures between the adjacent vehicle mounting devices 10 (adjacent vehicles), in order to prevent a trouble that the trigger signals generated from the trigger antennas 75, 76 provided on one of the vehicle mounting devices 10 cause transmission of the wheel-side information from the wheel-side devices 100 of the wheels of the vehicles on the adjacent vehicle mounting devices 10.

Figure 7:
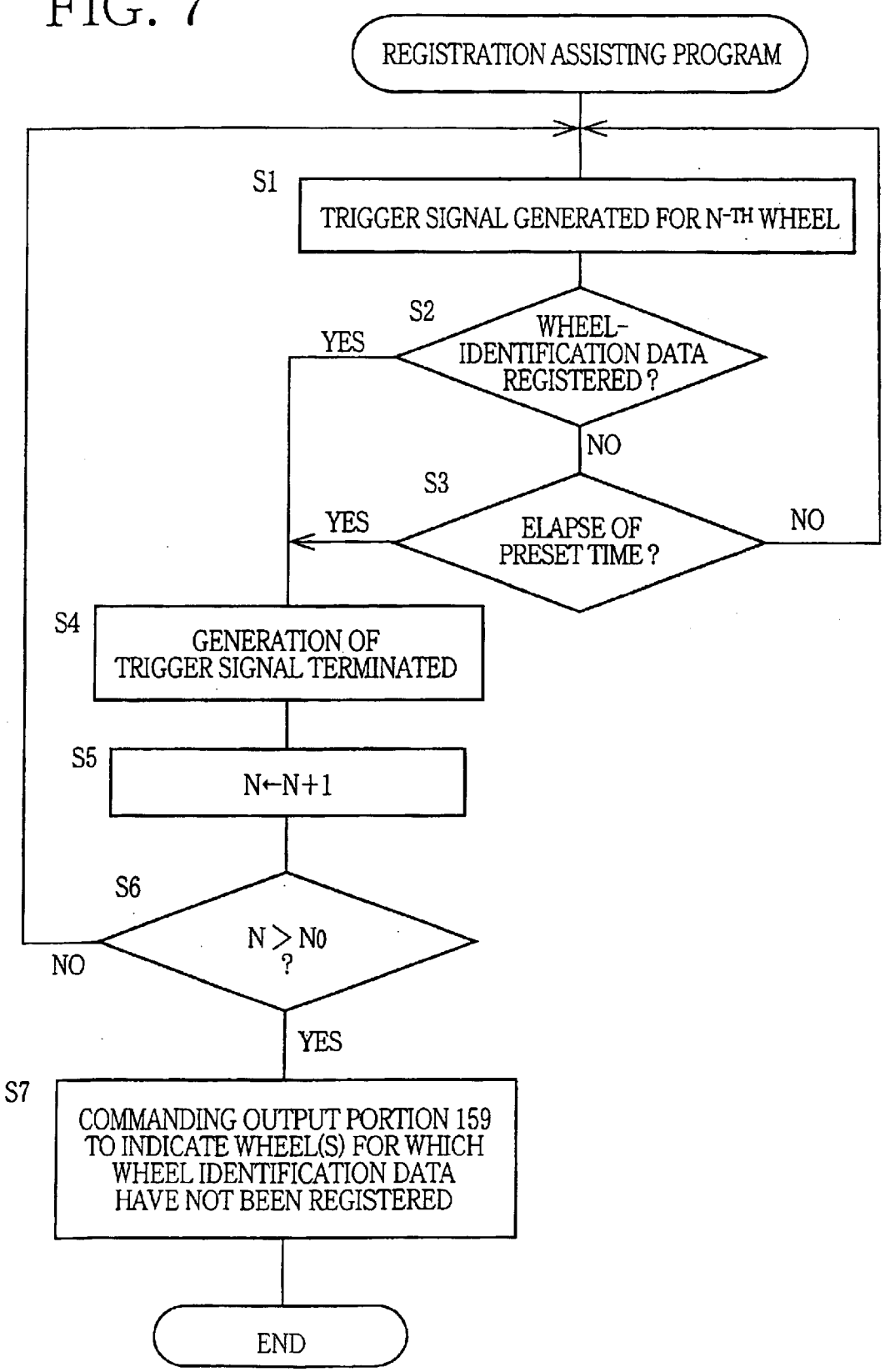
FIG. 7 is a flow chart illustrating a wheel-identification-data registration assisting program stored in a memory portion of a control device of the wheel-identification-data registration assisting apparatus.

The trigger signal generating devices 78 of the trigger devices 80 provided for the respective wheel-state inspecting devices 14 are controlled according to the wheel-inspection-data registration assisting program illustrated in the flow chart of FIG. 7, while the wheel-state inspecting devices 14 are operated to inspect the wheels 90 for their toe angle, camber angle and run-out angle during rotations of the wheels 90.

In the present embodiment, the front right wheel 90FR, front left wheel 90FL, rear right wheel 90 RR and rear left wheel 90RL are given serial numbers (Nos. 1 through 4), and the wheel identification data are registered in the order of the serial numbers. The wheel-identification-data registration assisting program is initiated with step S1 to command the trigger signal generating device 78 corresponding to the wheel 90 represented by a count of a counter N. When step S1 is implemented for the first time, the wheel No. 1 (front right wheel 90FR) is represented by the count of the counter N, so that the trigger signal generating device 78 corresponding to the wheel No. 1 is commanded to generate the trigger signal, whereby the wheel-side information is transmitted from the wheel-side device 100FR to the body-side device 102. Step S1 is followed by step S2 to determine whether the wheel identification data have been registered in the body-side device 102. Steps S1 and S2 are repeatedly implemented until a predetermined time has elapsed after the moment of generation of the trigger signal in step S1. If the wheel identification data have been registered in the body-side device 102 within the predetermined time, an affirmative decision (YES) is obtained in step S3, and the control flow goes to step S4 to command the relevant trigger signal generating device 78 to terminate the generation of the trigger signal. Step S4 is followed by step S5 to increment the counter N, and step S6 to determine whether the present count of the counter N is larger than the number (4) of the wheels 90. If a negative decision (NO) is obtained in step S6, the control flow goes back to step S1. Thus, the trigger signals are sequentially generated from the trigger signal generating devices 78 corresponding to the wheels Nos. 1–4 (wheels 90FR, 90FL, 90RR, 90RL), so that the wheel identification data of the four wheels 90 are sequentially registered in the memory 128 of the body-side device 102. The predetermined time used in step S3 may be a time required for each wheel 90 to rotate by 180°, or a time slightly longer than the time required for the 180° rotation of the wheel 90, since the trigger devices 80 are arranged such that the wheel identification data of each wheel 90 are registered during the 180° rotation of the wheel 90. Since each wheel 90 is rotated by two and a half turns (180°×5) for inspection of the wheels 90, the registration of the wheel identification data can be completed during the inspection, even where the predetermined time used in step S3 is set to be longer than the time required for each wheel 90 to rotate by 180°.

The present embodiment is arranged such that if the wheel identification data of any wheel 90 have not been registered within the predetermined time, the counter N is incremented to register the wheel identification data of the next wheel 90, since the registration of the wheel identification data of the four wheels 90 must be completed within the two and a half turns of the wheels. For any wheel whose identification data have not been registered according to the assisting program, the registration of the identification data of this wheel is subsequently effected. If an affirmative decision (YES) is obtained in step S6, the control flow goes to step S7 in which the output portion 159 is commanded to indicate any wheel whose identification data have not been registered.

As described above, the trigger devices 80 of the wheel-identification-data registration assisting apparatus according to the present embodiment are provided for the wheel inspecting devices 14, to assist the wheel-side devices 100 to transmit the wheel identification data to be registered in the body-side device 102. The present assisting apparatus eliminates a need of the worker to bring a trigger device to each of the positions aligned with the wheels, and permits automation of the registration of the wheel identification data. In addition, the present assisting apparatus improves an overall efficiency of operations to inspect the wheels 90 and register the wheel identification data, since the inspection and the registration are performed simultaneously.

Further, each wheel-side device 100 is rotated relative to the trigger antennas 75, 76 to bring the wheel-side device 100 into a position close or adjacent to the antennas 75, 76, so that the trigger signal is received by the wheel-side device 100, which transmits the wheel-side information in response to the trigger signal. Thus, the trigger signal is transmitted from the trigger antennas 75, 76 so that when the wheel-side device 100 is located close to the trigger antennas 75,76, the required intensity of the trigger signal can be reduced, and the amount of electric energy required by the trigger device 80 can be accordingly reduced. Further, the reduction of the intensity of the trigger signal makes it possible to reduce an influence of the trigger signal on the wheel-side devices of the wheels of the adjacent vehicles if any. However, the shielding structure is preferably interposed between the adjacent vehicles, as described above, if the wheels of these vehicles are inspected simultaneously.

It will be understood that the trigger device 80 cooperates with the wheel inspecting device 14 and the wheel rotating device 16 to constitute a wheel-identification-data registration assisting device 84 including a transmission commanding portion, while a portion of the control device 150 assigned to implement steps S1 and S4 constitutes an assisting-device control device operable to control the wheel-identification-data registration assisting device 84. Each trigger device 80 attached to the wheel inspecting device 14 includes a signal transmitting portion in the form of the trigger antennas 75, 76. The present wheel-identification-data registration assisting apparatus includes the above-indicated wheel-identification-data registration assisting device 84 and assisting-device control device 150. Thus, the wheel inspecting devices 14 and the wheel rotating device 16 which constitute the wheel inspecting unit 20 are utilized as a part of the wheel-identification-data registration assisting device 84 operable to assist the registration of the wheel identification data in the body-side device 102. The control device 150 functions to control not only the wheel inspecting device 14 and the wheel rotating device 16 but also the wheel-identification-data registration assisting device 84.

It will also be understood that the wheel rotating devices 16 constitute a relative-movement device in the form of a relative-rotation device operable to move each wheel-side device 100 and the trigger device 80 relative to each other, more specifically, to rotate the wheel-side device 100 with the wheel 90 relative to the trigger antennas 75, 76.

It will further be understood that each wheel-side device 100 constitutes remote detecting devices, while the body-side device 102 constitutes an information processing device. In the present embodiment, the wheel identification data are data-processing information used to process vehicle-state data in the form of the air pressure data representative of the detected tire air pressure of the wheel 90.

The trigger devices 80 of the wheels 90 may be controlled by the worker or operator. For instance, the worker manipulates an operator's control portion 164 (FIG. 1) connected to the control device 150, to control the trigger devices 80 of the wheels 90 one after another, while observing an indication provided on the output portion 159 in the form of a display device, which is arranged to indicate the wheel identification data registered in the body-side device 102. In this case, too, the registration of the wheel identification data is effected without the conventionally required operation to bring a trigger device to the positions of the wheels 90.

Figure 8:
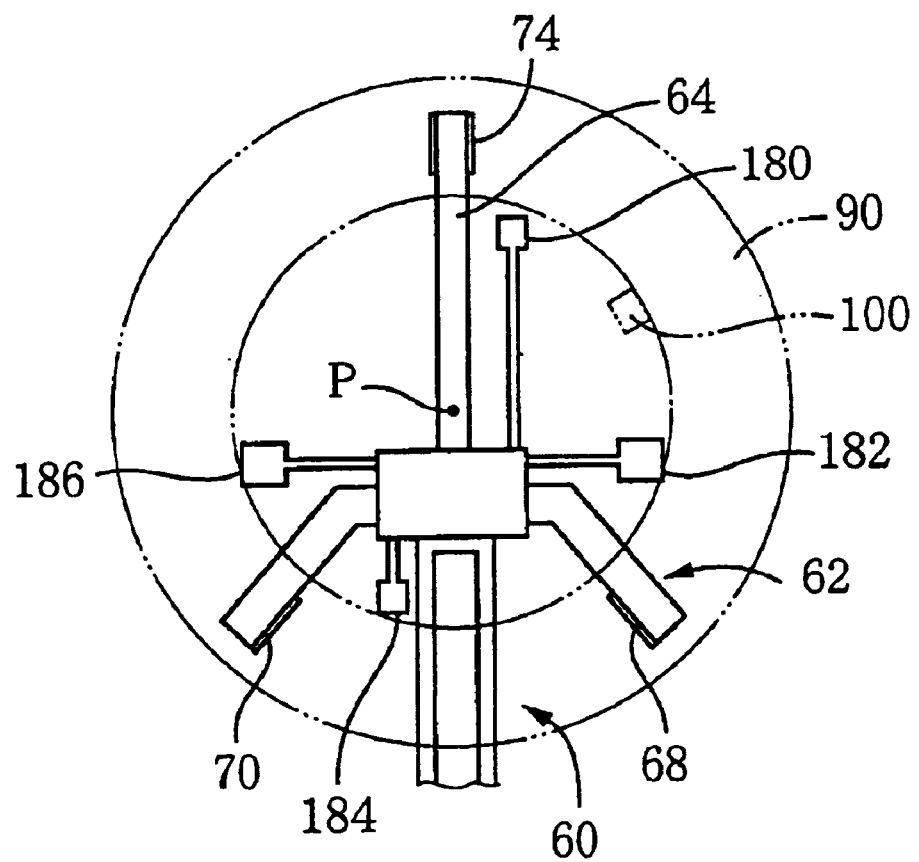
FIG. 8 is a view showing a wheel-identification-data registration assisting device of a wheel-identification-data registration assisting apparatus according to another embodiment of this invention.

While each trigger device 80 provided in the illustrated embodiment includes the two trigger antennas 75, 76, the trigger device 80 may include three or more trigger antennas. For example, four trigger antennas 180, 182, 184 and 186 maybe provided as in an embodiment of FIG. 8. These four trigger antennas 180–186 are equally spaced from each other in the rotating or circumferential direction of each wheel 90, namely, by an angular interval of 90° about the rotation axis P of the wheel 90. The frequency at which the trigger antennas are aligned with the wheel-side device 100 during one full turn of the wheel 90 increases with the number of the trigger antennas. Accordingly, the reliability of the trigger device 80 to generate the trigger signal to transmit the wheel identification data is increased with an increase in the number of the trigger antennas.

If a multiplicity of trigger antennas are provided, it is not necessary to rotate the wheel-side device 100 (wheel 90) and the trigger antennas, since sequential generation of the trigger signal from the multiple trigger antennas provides substantially the same result as obtained in the case of relative rotation of the wheel 90 and the trigger device 80. Further, the trigger device 8 for each wheel 90 may use only one trigger antenna. In this case, the wheels 90 must be rotated at a comparatively higher velocity, so that the registration of the wheel identification data of all wheels 90 is completed within the inspection of the wheels.

Figure 9:
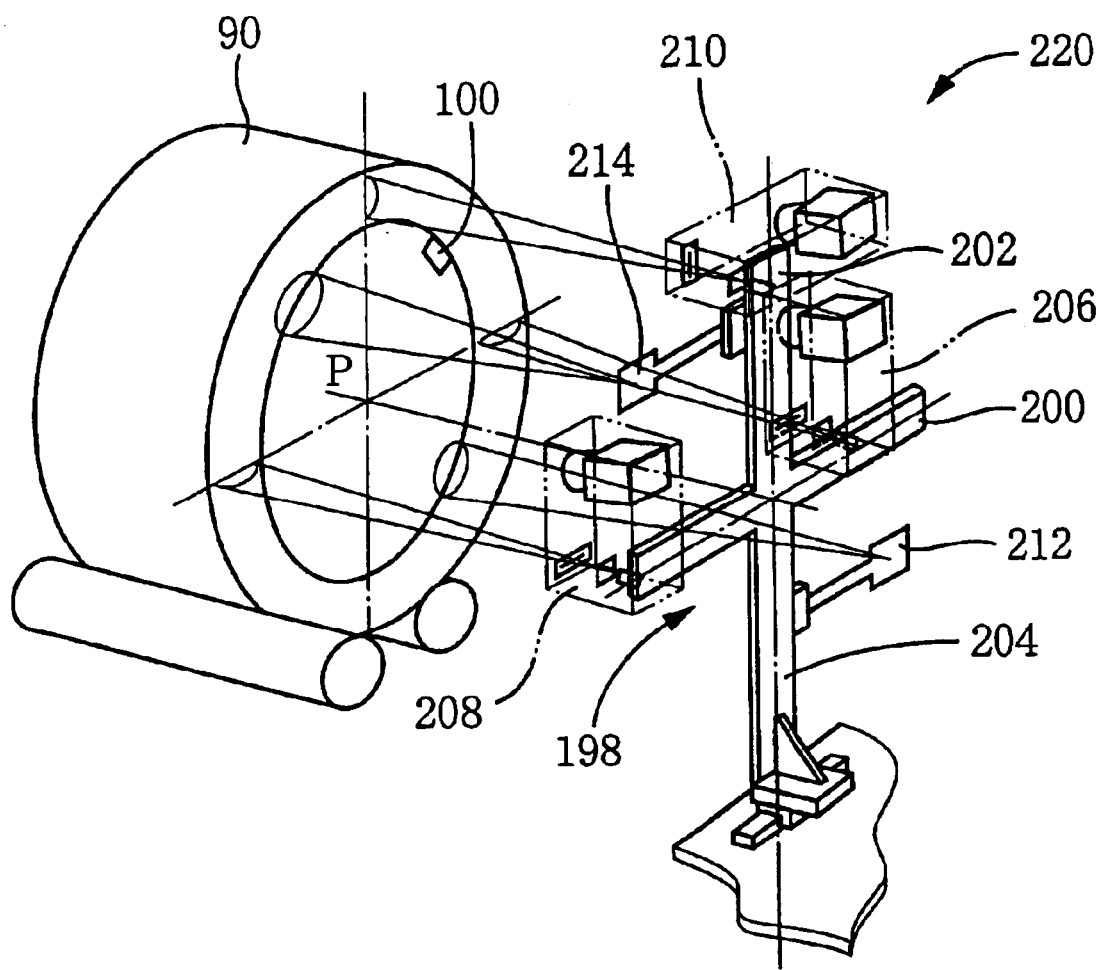
FIG. 9 is a view showing a wheel-identification-data registration assisting device of a wheel-identification-data registration assisting apparatus according to a further embodiment of this invention.

The embodiment described above is arranged such that each wheel inspecting device 14 uses the plurality of rollers 68, 70, 74, 94, 96 to hold the corresponding wheel 90 in direct contact with the wheel 90, for inspecting the wheel 90. However, the wheel inspecting device may be of a non-contact type operable to inspect the wheel 90 without a contact with the wheel 90. For example, a wheel inspecting device 198 constructed according to a further embodiment of this invention includes a crisscross main body 204 having a horizontal portion 200 extending in the horizontal direction and a vertical portion 202 extending in the vertical direction, and three distance measuring devices 206, 208 and 210 fixed to the main body 204, as shown in FIG. 9. The two distance measuring devices 206 and 208 are spaced apart from each other in the horizontal direction, while the third distance measuring device 210 is spaced apart from the devices 206, 208 in the vertical direction.

Each of the distance measuring devices 206–210 includes a light emitting portion and a light receiving portion. A component of an electromagnetic wave emitted from the light emitting portion is reflected by the surface of the wheel 90, and is received by the light receiving portion. A distance between the distance measuring device 206–210 and the surface of the wheel 90 is measured on the basis of the received electromagnetic wave, without a contact of the wheel inspecting device 198 with the wheel 90. In the present embodiment of FIG. 9, the toe angle of the wheel 90 is detected on the basis of the distances measured by the two distance measuring devices 206 and 208 which are spaced from each other in the horizontal direction.

Where the distances measured by the measuring devices 206 and 208 are represented by "a" and "b", respectively, while a distance between these two measuring devices 206, 208 is represented by "L", the toe angle "θ" of the wheel 90 is represented by the following equation:

θ=arctan (a·b)/L

The camber angle of the wheel 90 can be obtained on the basis of an average of the distances measured by the measuring devices 206 and 208, and a distance measured by the measuring device 210. Thus, the wheel inspecting device 198 is arranged to obtain the toe angle and the camber angle of the wheel 90. The manner of detecting the toe and camber angles is disclosed in JP-A-2001-4344.

The toe angle of the wheel 90 may be measured while the wheel 90 is rotated. The amount of variation of the toe angle during one full turn of the wheel 90 can be obtained as the run-out angle. In the embodiment of FIG. 9 using the non-contact type wheel inspecting device 198, the wheel 90 is not held on its opposite sides. Accordingly, the wheel inspecting device 198 may be disposed on the outer side of the wheel 90 and arranged to be movable toward and away from the wheel 90. The wheel inspecting device 198 may be fixed to the body of the vehicle, immovably relative to the wheel 90, at a suitable position at which the wheel inspecting device 198 does not cause any inconvenience during running of the vehicle.

In the embodiment of FIG. 9, two antennas 212, 214 are attached to the main body 204 such that the two antennas 212, 214 are spaced from each other by 180° in the rotating direction of the wheel 90, namely, about the rotation axis P of the wheel 90, as in the first embodiment of FIG. 3. In the present embodiment, the trigger signal is transmitted from the trigger antennas 212, 214 to register the wheel identification data in the body-side device 102, while the wheel 90 is inspected for its toe angle, etc., as in the first embodiment. Thus, a trigger device including the trigger antennas 212, 214 cooperates with the wheel inspecting device 198 to constitute a wheel-identification-data registration assisting device 220.

It is not essential that the inspection of the wheels and the registration of the wheel identification data are effected concurrently. Namely, the inspection of the wheels and the registration of the wheel identification data may be effected at different times, independently of each other. Further, an exclusive wheel inspecting device need not be provided to inspect the wheels 90. That is, the wheel-identification-data registration assisting device may be utilized to inspect the wheels. In any case, the worker is not required to bring the conventionally used trigger device to the appropriate positions of the wheels, to register the wheel identification data. Namely, the present modified embodiment also permits automatic registration of the wheel identification data.

Figure 10:
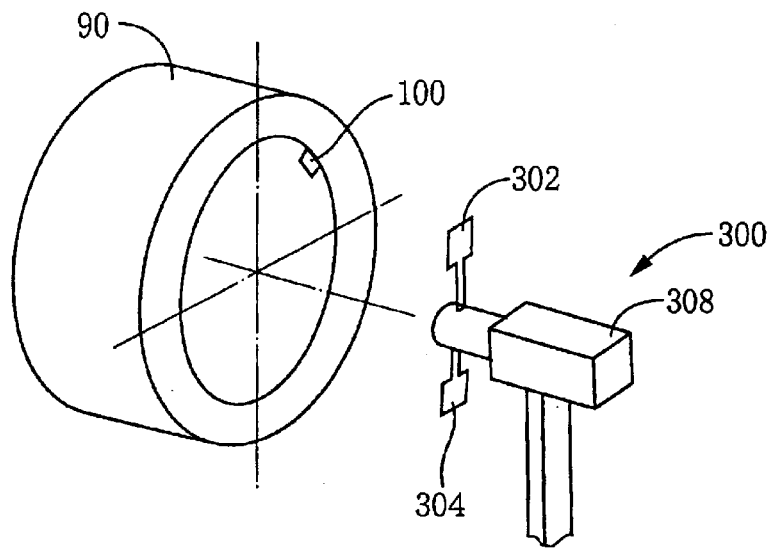
FIG. 10 is a view showing a wheel-identification-data registration assisting device of a wheel-identification-data registration assisting apparatus according to a still further embodiment of this invention.
Figure 11:
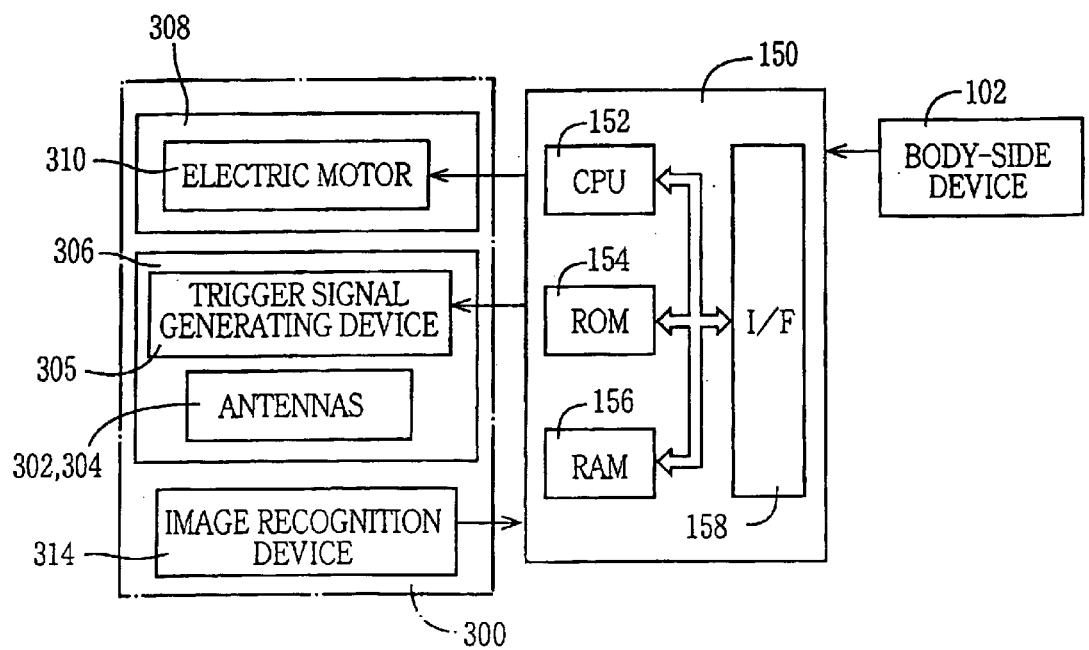
FIG. 11 is a block diagram schematically showing a control device of the wheel-identification-data registration assisting device of FIG. 10.

One example of the above-indicated modification is shown in FIGS. 10 and 11, in which a wheel-identification-data registration assisting device 300 is provided for each wheel 90. This assisting device 300 includes a trigger device 306, and an antenna rotating device 308. The trigger device 306 includes two trigger antennas 302, 304 and a trigger signal generating device 305. The antenna rotating device 308 is operable to rotate the trigger antennas 302, 304.

The antenna rotating device 308 includes an antenna holder member carrying the two antennas 302, 304 in a substantially 180°-spaced-apart relationship with each other, and an electric motor 310 (shown in FIG. 11). The electric motor 310 has an output shaft to which the antenna holder member is fixed, so that the two antennas 302, 304 are rotated with the antenna holder member when the antenna holder member is rotated by the electric motor 310.

To the input/output portion (I/F) of the control device 150, there are connected an image recognition device 314 as well as the antenna rotating device 308 (electric motor 310) and the trigger device 305. The image recognition device 314 is arranged to recognize the wheel-side device 100 of each wheel 90. If it is difficult to arrange the image recognition device 314 to recognize the wheel-side device 100, the image recognition device 314 may be arranged to recognize a valve of the tire of the wheel 90, since the valve is located close to the wheel-side device 100.

The present embodiment of FIGS. 10 and 11 is arranged to control at least one of the electric motor 310 (for rotating the antennas 302, 304) and the trigger signal generating device 305, on the basis of an output of the image recognition device 314.

For instance, when the image recognition device 314 detects that one of the trigger antennas 302, 304 is located near or close to the wheel-side device 100, the operating speed of the electric motor 310 is lowered, and the electric motor 310 is turned off when the operating speed is lowered below an upper limit below which communication between the wheel-side device 100 and the antenna 302, 304 close to the wheel-side device 100 is possible. Alternatively, the trigger signal generating device 306 is commanded to generate the trigger signal only when either one of the antennas 302, 304 is located near or close to the wheel-side device 100, and not to generate the trigger signal in the other cases. Where the trigger signal generating device 306 is arranged such that the intensity of the trigger signal is adjustable, the intensity of the trigger signal generated by the trigger signal generating device 306 may be increased only when either one of the antennas 302, 304 is located close to the wheel-side device 100.

In the embodiment of FIGS. 10 and 11, the antenna rotating device 308 constitutes a transmitter rotating device, and a portion of the control device 150 assigned to control the antenna rotating device 308 constitutes a relative-rotation control portion, while a portion of the control device 150 assigned to control the trigger signal generating device 305 constitutes a transmission control portion.

The time required to register the wheel identification data can be reduced by rotating both of the wheel 90 and the trigger antennas 302, 304 to thereby increase the speed of the relative rotation of the wheel 90 and the antennas 302, 304.

Since the wheel 90 need not be rotated in the present embodiment, the wheel rotating device 16 is not essential.

The identification data identifying a spare wheel (spare tire) accommodated in a rear luggage compartment of the vehicle may be registered in the body-side device 102.

Although the embodiments described above are arranged such that the wheel-identification-data registration assisting device includes a transmission commanding portion operable to command the wheel-side device 100 to transmit the wheel identification data, this arrangement is not essential.

Figure 12A:
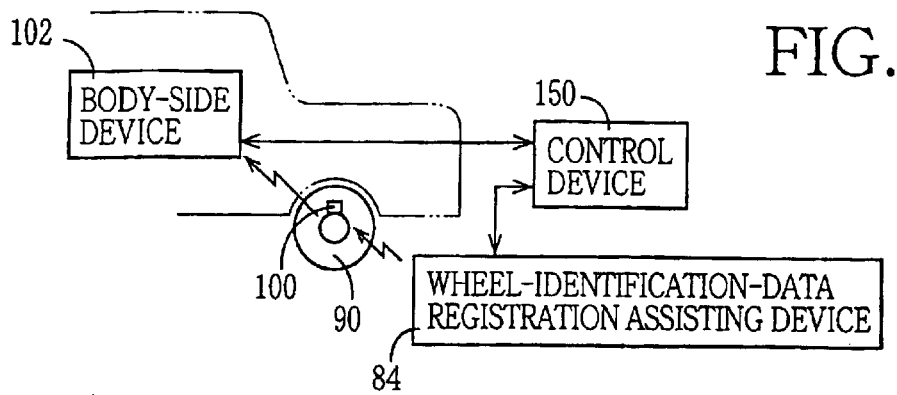
FIGS. 12A–12D are views schematically illustrating examples wherein the registration of wheel identification data is assisted by wheel-identification-data registration assisting apparatuses according to further embodiments of the present invention.

Various forms of the wheel-identification-data registration assisting device are illustrated in FIGS. 12A–12D. In the embodiment of FIG. 12A, the wheel-identification-data registration assisting device 84 is arranged to assist the transmission of the wheel identification data from the wheel-side device 100 to the body-side device 102, as in the preceding embodiments.

Figure 12B:
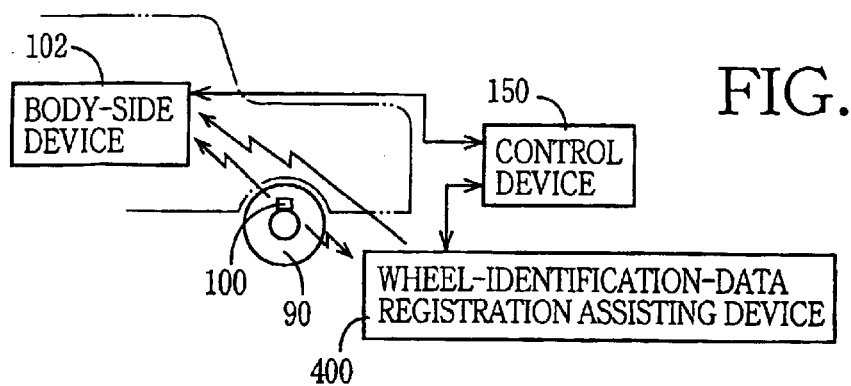

In the embodiment of FIG. 12B, a wheel-identification-data registration assisting device 400 is operable when it receives the wheel identification data from corresponding wheel-side device 100. In this case, the assisting device 400 transmits to the body-side device 102 information indicating that the wheel identification data have been transmitted from the wheel-side device 100 to the body-side device 102. The body-side device 102 receives the wheel identification data from the four wheel-side devices 100, at a predetermined time interval, and stores the received wheel identification data. If the body-side device 102 does not receive from the assisting device 400, within a predetermined time, the information indicating that the wheel identification data have been transmitted to the body-side device 102, the body-side device 102 erases the received wheel identification data once stored therein. If the body-side device 102 receives the information from the assisting device 400 within the predetermined time, the body-side device 102 registers the received wheel identification data for the wheel 90 corresponding to the assisting device 400. The control device 150 sequentially permits the assisting devices 400 corresponding to the respective wheels 90 to transmit the information indicating the transmission of the wheel identification data from the corresponding wheel-side device 100. The assisting device 400 may transmit to the body-side device 102 wheel-position information indicative of the position of the corresponding wheel 90, as well as the information indicating the transmission of the wheel identification data from the corresponding wheel-side device 100 to the body-side device 102. In this case, the body-side device 102 registers the wheel-position information together with the wheel identification data. In the present embodiment, the wheel-identification-data registration assisting device 400 includes an indicator portion operable to inform the body-side device 102 that the wheel identification data have been transmitted from the corresponding wheel-side device 100 to the body-side device. The control device 150 includes a control portion operable to control that indicator portion of the assisting device 400.

Figure 12C:
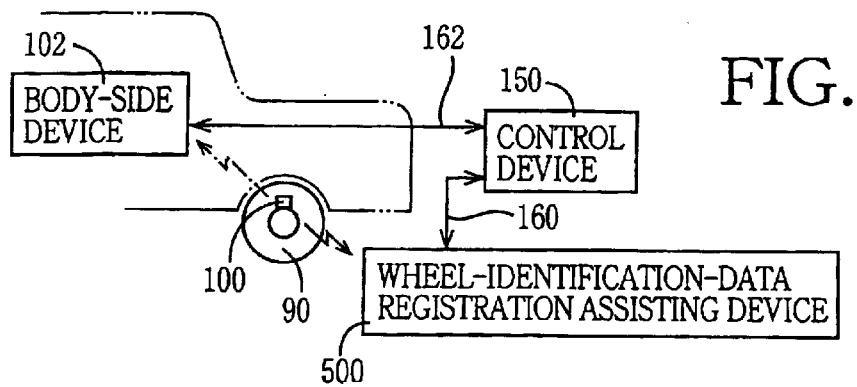

In the embodiment of FIG. 12C, a wheel-identification-data registration assisting device 500 is operable when it receives the wheel identification data from the corresponding wheel-side device 100. In this case, the assisting device 500 sends the received wheel identification data to the body-side device 102 through the signal line 160, control device 150 and signal line 162, so that the wheel identification data are registered in the body-side device 102. If the reception sensitivity of the body-side device 102 is extremely low, the wheel-side information transmitted from the wheel-side device may not be received by the body-side device 102. In the present embodiment, however, the wheel identification data can be registered in the body-side device 102, even in this event, through the assisting device 500. The control device 150 controls the assisting devices 500 corresponding to the wheel-side devices 100, so that the body side device 102 is supplied with the wheel identification data of the wheel-side devices 100, through the respective assisting devices 500, at a predetermined interval.

In the embodiment of FIG. 12C, the wheel identification data is supplied from the assisting device 500 to the body-side device 102 through the signal lines 160, 162, so that the wheel identification data can be registered in the body-side device 102 with a higher degree of stability. Since the reception sensitivity of the body-side device 102 is made relatively low, the body-side device 102 is prevented from receiving the wheel identification data from the wheel-side devices of the other vehicles if any adjacent to the vehicle in question. In the present embodiment, the assisting device 500 includes a wheel-identification-data supply portion operable to supply the body-side device 102 with the wheel identification data received from the wheel-side device 100.

The control device 150 may control the assisting devices 500 of the wheels 90 such that the body-side device 102 is supplied with the wheel identification data after the assisting devices 500 of all wheels 90 have received the wheel identification data from the corresponding wheel-side devices 100.

Figure 12D:
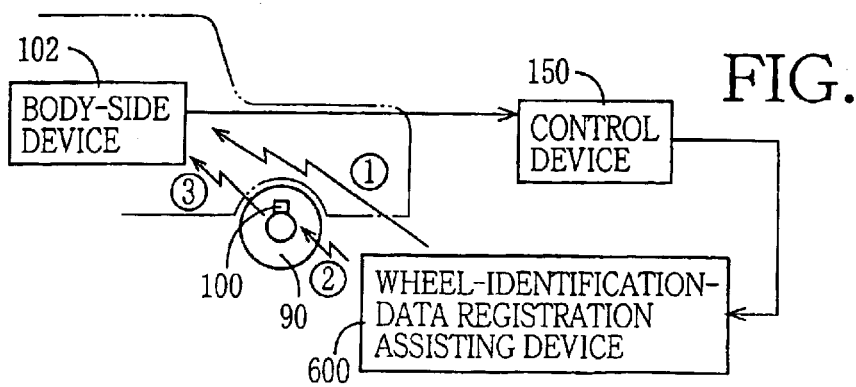

In the embodiment of FIG. 12D, a wheel-identification-data registration assisting device 600 is operable to transmit to the body-side device 102 registration-requesting information requesting the body-side device 102 to register the wheel identification data. In response to the received information, the body-side device 102 registers the wheel identification data. The assisting devices 600 of the wheels 90 are sequentially commanded by the control device 150, to request the body-side device 102 to register the wheel identification data. The commanded assisting device 600 transmits the trigger signal to the wheel-side device 100, and the body-side device 102 registers the wheel identification data received from the wheel-side device 100 after the reception of the registration-requesting information. The operation mode of the body-side device 102 may be changed from the air-pressure-data obtaining mode to the wheel-identification-data registering mode when the body-side device 102 receives the registration-requesting information from the assisting device 600. In the present embodiment, the assisting device 600 includes a registration assisting portion operable to assist the body-side device 102 to register the wheel identification data, while a portion of the control device 150 assigned to control the assisting device 600 constitutes a registration control portion operable to control the registration assisting portion.

The wheel-identification-data registration assisting device may be arranged to assist the inspection of the wheel identification data registered in the body-side device 102. For example, the assisting device 84 may be modified to command the corresponding wheel-side device 100 to transmit the wheel identification data to the body-side device 102, when the body-side device 102 inspects the registered information corresponding to the wheel identification data, that is, checks if the registered information correctly identify the wheel 90 corresponding to the assisting device 14. In this embodiment, the assisting device 84 includes an inspection assisting portion operable to assist the inspection of the information once registered in the body-side device 102. This inspection assisting portion includes a data-transmission commanding portion operable to command the wheel-side device 100 to transmit the wheel identification data to the body-side device 102.

While the wheel identification data transmitted from each wheel-side device 100 are registered in the body-side device 102, in the embodiments described above, the air pressure data also included in the wheel-side information may be registered in the body-side device 102, together with the wheel identification data. Where each wheel-side device 100 is arranged to detect a variation in the tire air pressure of the corresponding wheel 90, the initial value of the tire air pressure represented by the air pressure data included in the wheel-side information received from the wheel-side device 100 is also registered in the body-side device 102.

Figure 13:
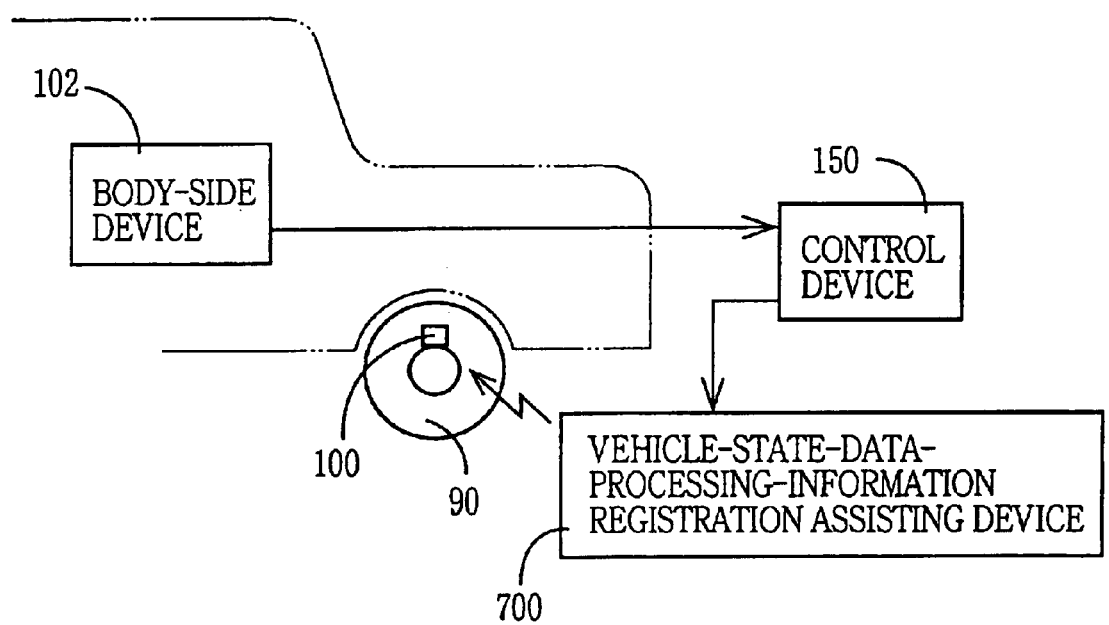
FIG. 13 is a view showing an example wherein the registration of wheel identification data is assisted by a wheel-identification-data registration assisting apparatus according to a yet further embodiment of this invention.

Further, information transmitted from the body-side device 102 may be registered in the wheel-side devices 100. Where the wheel-side devices 100 are arranged to determine whether the detected air pressure values are normal or not, for example, each wheel-side device 100 transmits to the body-side device 102 information indicating whether the detected air pressure is normal or not. In this case, the body-side device 102 is arranged to supply each wheel-side device 100 with data indicative of a threshold value used by the wheel-side device 100 to determine whether the detected air pressure value is normal or not. In an embodiment of FIG. 13, a vehicle-state-data-processing-information registration assisting device 700 is operable to supply the wheel-side device 100 with the threshold value data received from the body-side device 102. The assisting device 700 may be arranged to supply the wheel-side device 100 with any other data (e.g., a program for transmitting the wheel-side information) required by the wheel-side device 100. In this case, the threshold value data supplied from the assisting device 700 to the wheel-side device 100 are considered to be data-processing information used to process vehicle-state data in the form of the air pressure data obtained by the wheel-side device 100.

As described above, the wheel-identification-data registration assisting device may be utilized to inspect the wheel identification data registered in the body-side device 102, that is, to effect an inspection as to whether the wheel identification data stored in the body-side device 102 correctly identify the wheel 90 in question. This inspection is effected by determining whether the wheel identification data already registered in the body-side device 102 are coincident with the wheel identification data presently transmitted from the wheel-side device 100 for the purpose of inspection of the information registered in the body-side device 102. The wheel identification data identify either the wheel 90 or the position on the vehicle at which the wheel 90 is installed.

The inspection of the registered wheel identification data may be effected immediately after the registration, with an assistance by the wheel-identification-data registration assisting device used for the registration. Alternatively, the inspection may be effected when any other state of the vehicle is inspected. Further, the inspection of the registered wheel identification data may be effected after the inspected vehicle is delivered from the manufacturer, for instance, when the vehicle owned by the user is subjected to a periodic inspection, or when any trouble with the vehicle is found.

Although the vehicle mounting device 10 is arranged to rotate the wheels 90 by rotating the two wheel rotating rollers 24, 26, this arrangement is not essential. For instance, the drive wheels may be rotated by the drive power source provided on the vehicle. In this case, the rollers 24, 26 may be used to permit the drive wheels to be rotated with the drive power source. The two rollers 24, 26 may be replaced by a single wheel rotating member such as a rotating drum having a relatively large diameter.

The body-side device 102 may be arranged to register data or information different from the wheel identification data received from the wheel-side devices 100, as long as the registered data or information identify or identifies the wheel. Where the wheel identification data received from the wheel-side device 100 represent a numerical value indicative of the wheel, the information registered in the body-side device 102 may be such that a sum or a difference of the numerical value represented by the information registered in the body-side device 102 and the numerical value represented by the received wheel identification data is equal to a predetermined value.

While the assisting device is disposed on the vehicle mounting device 10 in the illustrated embodiments, this arrangement is not essential. For instance, the assisting device may be disposed on a floor or ground at a location of inspection of the vehicle.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A wheel-identification-data registration assisting apparatus operable with a system including a body-side device disposed on a body of a vehicle and a plurality of wheel-side devices disposed on respective wheels of the vehicle, said apparatus being operable to assist said system in an operation associated with registration in said body-side device of information corresponding to wheel identification data which identify each of said plurality of wheel-side devices and which are transmitted from said each wheel-side device, said wheel-identification-data registration assisting apparatus comprising:

a plurality of wheel-identification-data registration assisting devices operable to assist said system in at least a portion of the operation associated with said registration of the information corresponding to said wheel identification data in said body-side device, each of said plurality of wheel-identification-data registration assisting devices including a signal transmitting portion operable to effect at least one-way transmission of a signal between a corresponding one of said plurality of wheel-side devices and said signal transmitting portion, said each wheel-identification-data registration assisting device being operable when said signal transmitting portion is located close to said corresponding one wheel-side device;

a relative-movement device operable to move said signal transmitting portion and said corresponding one wheel-side device relative to each other; and an assisting-device control device operable to control said plurality of wheel-identification-data registration assisting devices, and said relative-movement device, wherein said signal transmitting portion is provided outside the vehicle.

2. The wheel-identification-data registration assisting apparatus according to claim 1, wherein each of said plurality of wheel-identification-data registration assisting devices includes at least one of (a) a registration assisting portion operable to assist said system in at least a portion of a series of operation of the system from transmission of said wheel identification data from a corresponding one of said plurality of wheel-side devices to the registration of said information corresponding to said wheel identification data in said body-side device, and (b) a data-inspection assisting portion operable to assist said system in at least a portion of a series of operation from the transmission of said wheel identification data from said corresponding one wheel-side device to inspection of said information corresponding to said wheel identification data which has been registered in said body-side device.

3. The wheel-identification-data registration assisting apparatus according to claim 1, wherein said plurality of wheel-identification-data registration assisting devices include respective transmission-commanding portion operable to command said plurality of wheel-side devices, respectively, to transmit said wheel identification data, and said assisting-device control device includes a transmission control portion operable to control said transmission-commanding portions to control the transmission of said wheel identification data from each of said plurality of wheel-side devices.

4. The wheel-identification-data registration assisting apparatus according to claim 1, wherein each of said wheel-identification-data registration assisting devices includes an indicator portion operable upon reception of said wheel identification data from a corresponding one of said plurality wheel-side devices, to supply said body-side device with at least one of said wheel identification data and information indicating the reception of said wheel identification data, and said assisting-device control device includes a control portion operable to control said indicator portion of said each wheel-identification-data registration assisting device.

5. The wheel-identification-data registration assisting apparatus according to claim 1, wherein each of said wheel-identification-data registration assisting devices includes a wheel-identification-data supply portion operable upon reception of said wheel identification data from a corresponding one of said plurality wheel-side devices, to supply said body-side device with said wheel identification data received from said corresponding one wheel-side device, and said assisting-device control device includes a control portion operable to control said wheel-identification-data supply portion of said each wheel-identification-data registration assisting device.

6. The wheel-identification-data registration assisting apparatus according to claim 1, wherein each of said wheel-identification-data registration assisting devices includes a registration assisting portion operable to assist said body-side device to register the information corresponding to said wheel identification data, and said assisting-device control device includes a registration control portion operable to control said registration assisting portion of said each wheel-identification-data registration assisting device.

7. The wheel-identification-data registration assisting apparatus according to claim 1, wherein each of said plurality of wheel-identification-data registration assisting devices includes an inspection assisting portion operable to assist said body-side device to inspect said information corresponding to said wheel identification data, which information have been registered in said body-side device, and said assisting-device control device includes an inspection control portion operable to control said inspection assisting portion of said each wheel-identification-data registration assisting device.

8. The wheel-identification-data registration assisting apparatus according to claim 7, wherein said inspection assisting portion includes a data-transmission commanding portion operable to command a corresponding one of said plurality of wheel-side devices to transmit said wheel identification data to said body-side device.

9. The wheel-identification-data registration assisting apparatus according to claim 1, wherein said each wheel-identification-data registration assisting device is operable to assist said system in at least a portion of a series of operation of the system from transmission of said wheel identification data from said corresponding one wheel-side device to the registration of said information corresponding to said wheel identification data in said body-side device.

10. The wheel-identification-data registration assisting apparatus according to claim 1, wherein said signal transmitting portion is provided with an adjusting device operable to adjust at least one of an intensity of said signal transmitted from said signal transmitting portion and a reception sensitivity of said signal transmitting portion with respect to said signal transmitted from the corresponding wheel.

11. The wheel-identification-data registration assisting apparatus according to claim 9, wherein said relative-movement device includes a relative-rotation device operable to rotate said signal transmitting portion and said corresponding wheel relative to each other about an axis of rotation of said corresponding wheel.

12. The wheel-identification-data registration assisting apparatus according to claim 9, wherein said relative-movement device includes a rotating device operable to rotate said signal transmitting portion.

13. The wheel-identification-data registration assisting apparatus according to claim 9, wherein said assisting-device control device includes (a) a relative-movement control portion operable to control said relative-movement device to establish a predetermined relative position between said signal transmitting portion and said corresponding one wheel-side device, and (b) a transmission control portion operable to command said signal transmitting portion to effect at least said one-way transmission of said signal when said signal transmitting portion and said corresponding one wheel-side device are located close to each other.

14. The wheel-identification-data registration assisting apparatus according to claim 1, further comprising a supporting device arranged to support the vehicle and said plurality of wheel-identification-data registration assisting devices such that said plurality of wheel-identification-data registration assisting devices have respective predetermined positions relative to the vehicle.

15. The wheel-identification-data registration assisting apparatus according to claim 14, wherein said supporting device includes (a) a main body, (b) a movable member which supports each of said plurality of wheel-identification-data registration assisting devices and which is supported by said main body such that said movable member is movable in a direction substantially parallel to an axis (P) of rotation of the wheel corresponding to said each wheel-identification-data registration assisting device, and (c) a positioning device operable, when the vehicle is located at a predetermined position relative to said main body, to move said movable member for thereby moving said each wheel-identification-data registration assisting device toward and away from each other.

16. The wheel-identification-data registration assisting apparatus according to claim 14, wherein said supporting device is provided with a wheel-rotation permitting device which permits each of said wheels to be rotated while the vehicle is located at a predetermined position relative to said main body.

17. The wheel-identification-data registration assisting apparatus according to claim 14, wherein said supporting device includes a plurality of rollers disposed for each of the wheels while the vehicle is located at a predetermined position relative to said main body, so as to be held in contact with said each wheel, and a roller drive device operable to rotate said plurality of rollers.

18. The wheel-identification-data registration assisting apparatus according to claim 1, wherein each of said plurality of wheel-side devices includes (a) a wheel-state detecting portion operable to detect a state of a corresponding one of the wheels, and (b) a wheel-side information transmitting device operable to transmit wheel-side information including wheel-state data representative of the state of said corresponding one wheel detected by said wheel-state detecting portion, and said wheel identification data identifying said corresponding one wheel, and wherein said body-side device includes (i) an information receiving device operable to receive said wheel-side information transmitted from said each wheel-side device, (ii) a memory for storing said information corresponding to said wheel identification data of each of the wheels, and (iii) a wheel-state obtaining portion operable to obtain the state of said each wheel identified by said wheel identification data, on the basis of said wheel-state data, when said wheel-state obtaining portion determines, on the basis of said wheel identification data received by said information receiving device and said information corresponding to said wheel identification data stored in said memory, that the wheel-side information received by said information receiving device are the information of said each wheel identified by the wheel identification data received by said information receiving device.

19. The wheel-identification-data registration assisting apparatus according to claim 1, wherein each of said plurality of wheel-identification-data registration assisting devices is supported by a main body of a wheel inspecting device which is located outside the vehicle and operable to detect a state in which the wheel corresponding to said each wheel-identification-data registration assisting device is mounted on the vehicle.

20. The wheel-identification-data registration assisting apparatus according to claim 1, wherein each of said plurality of wheel-identification-data registration assisting devices is supported by a main body of a wheel adjusting device which is located outside the vehicle and operable to adjust a state in which the wheel corresponding to said each wheel-identification-data registration assisting device is mounted on the vehicle.

21. The wheel-identification-data registration assisting apparatus according to claim 1, wherein said assisting-device control device includes a registration-state obtaining device operable to obtain a state of the operation of said body-side device associated with the registration of said information corresponding to said wheel identification data.

22. The wheel-identification-data registration assisting apparatus according to claim 1, wherein each of said plurality of wheel-identification-data registration assisting devices is operable to assist said system in at least a portion of a series of operation of the system from transmission of said wheel identification data from a corresponding one of said plurality of wheel-side devices to the registration of said information corresponding to said wheel identification data in said body-side device.

23. The wheel-identification-data registration assisting apparatus according to claim 1, wherein each of said plurality of wheel-identification-data registration assisting device includes a wheel-identification-data inspection assisting device operable to assist said system in an operation associated with inspection of a state of registration in said body-side device of said information corresponding to said wheel identification data, and said assisting-device control device includes a control portion operable to control said wheel-identification-data inspection assisting device.

24. The wheel-identification-data registration assisting apparatus according to claim 23, wherein said wheel-identification-data inspection assisting device is operable to assist said system in inspecting said information corresponding to said wheel identification data registered in said body-side device.

25. The wheel-identification-data registration assisting apparatus according to claim 24, wherein said wheel-identification-data inspection assisting device is operable to assist said system in checking if said information registered in said body-side device correctly identifies said each wheel-side device from which said body-side device has received said wheel identification data from said each wheel-side device.

26. The wheel-identification-data registration assisting apparatus according to claim 1, wherein each of said plurality of wheel-identification-data registration assisting devices includes a wheel-identification-data supply assisting device operable to assist said system in at least a portion of a series of operation of said system from transmission of said wheel identification data from a corresponding one of said plurality of wheel-side devices to reception of said wheel identification data by said body-side device, and said assisting-device control device includes a control portion operable to control said wheel-identification-data supply assisting device.

27. The wheel-identification-data registration assisting apparatus according to claim 1, wherein said signal transmitting portion is operable to transmit a trigger signal to said corresponding one wheel-side device, and said corresponding one wheel-side device is operable to transmit to said body-side device information including said wheel identification data, in response to said trigger signal received from said signal transmitting portion.

28. An identification-data registration assisting apparatus operable with a system including an information processing device and a remote detecting device operable to detect a state of a vehicle and transmit in a wireless fashion vehicle-state data representative of the detected state of the vehicle and identification data identifying said remote detecting device, said apparatus being operable to assist said system in an operation of the system associated with registration in said information processing device of information corresponding to said identification data, said apparatus comprising:

an identification-data registration assisting device operable to assist said system in at least a portion of a series of operation of the system to register said information corresponding to said identification data in said information processing device, said identification-data registration assisting device including a signal transmitting portion operable to effect at least one-way transmission of a signal between said remote detecting device and said signal transmitting portion, said identification-data registration assisting device being operable when the vehicle is located at a predetermined position and when said signal transmitting portion is located close to said remote detecting device;

a relative-movement device operable to move said signal transmitting portion and said remote detecting device relative to each other; and an assisting-device control device operable to control said identification-data registration assisting device and said relative-movement device, wherein said signal transmitting portion is provided outside the vehicle.

29. The identification-data registration assisting apparatus according to claim 28, wherein said identification-data registration assisting device is supported by a main body of a wheel inspecting device which is located outside the vehicle and operable to detect a state in which the wheel corresponding to said identification-data registration assisting device is mounted on the vehicle.

30. The identification-data registration assisting apparatus according to claim 28, wherein said identification-data registration assisting device is supported by a main body of a wheel adjusting device which is located outside the vehicle and operable to adjust a state in which the wheel corresponding to said identification-data registration assisting device is mounted on the vehicle.

31. The identification-data registration assisting apparatus according to claim 28, wherein said signal transmitting portion is operable to transmit a trigger signal to said remote detecting device, and said remote detecting device is operable to transmit to said information processing device information including said identification data, in response to said trigger signal received from said signal transmitting portion.

32. A data-processing-information registration assisting apparatus operable with a system including an information processing device and a remote detecting device including a vehicle-state detecting portion operable to detect a state of a vehicle, said apparatus being operable to assist said system in an operation associated with registration, in at least one of said remote detecting device and said information processing device, of information corresponding to data-processing information used to process vehicle-state data representative of the state of the vehicle, said data-processing-information registration assisting apparatus comprising:
- a data-processing-information registration assisting device movable and operable to assist said system in at least a portion of the operation associated with said registration of the information corresponding to said data-processing information in said at least one of said remote detecting device and said information processing device, said data-processing-information registration assisting device including a signal transmitting portion operable to effect at least one-way transmission of a signal between said remote detecting device and said signal transmitting portion, said data-processing-information registration assisting device being operable when the vehicle is located at a predetermined position and when said signal transmitting portion is located close to said remote detecting device;
- a relative-movement device operable to move said signal transmitting portion and said remote detecting device relative to each other; and
- an assisting-device control device operable to control said data-processing-information registration assisting device, and said relative-movement device,
- wherein said signal transmitting portion is provided outside the vehicle.

33. The data-processing-information registration assisting apparatus according to claim 32, said data-processing-information registration assisting devices is supported by a main body of a wheel inspecting device which is located outside the vehicle and operable to detect a state in which the wheel corresponding to said identification-data registration assisting device is mounted on the vehicle.

34. The data-processing-information registration assisting apparatus according to claim 32, wherein said data-processing-information registration assisting device is supported by a main body of a wheel adjusting device which is located outside the vehicle and operable to adjust a state in which the wheel corresponding to said data-processing-information registration assisting device is mounted on the vehicle.

35. The data-processing-information registration assisting apparatus according to claim 32, wherein said signal transmitting portion is operable to transmit a trigger signal to said remote detecting device, and said remote detecting device is operable to transmit to said information processing device information including said identification data, in response to said trigger signal received from said signal transmitting portion.

* * * * *